US012730576B2

(12) United States Patent
Karlekar et al.

(10) Patent No.: US 12,730,576 B2
(45) Date of Patent: Sep. 8, 2026

(54) INTER-CLOUD SHARED CONTENT DATA MANAGEMENT

(71) Applicant: Nutanix, Inc., San Jose, CA (US)

(72) Inventors: Chaitanya Sudhir Karlekar, San Ramon, CA (US); Ajaykrishna Raghavan, Santa Clara, CA (US); Aman Nijhawan, Seattle, WA (US); Mohammed Asif, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/497,932

(22) Filed: Oct. 30, 2023

(65) Prior Publication Data

US 2025/0138740 A1 May 1, 2025

(51) Int. Cl.
*G06F 3/06* (2006.01)

(52) U.S. Cl.
CPC .......... *G06F 3/0641* (2013.01); *G06F 3/0604* (2013.01); *G06F 3/0634* (2013.01); *G06F 3/067* (2013.01)

(58) Field of Classification Search
CPC .... G06F 3/0641; G06F 3/0604; G06F 3/0634; G06F 3/067
See application file for complete search history.

(56) References Cited

U.S. PATENT DOCUMENTS 5,812,773 A 9/1998 Norin
7,003,560 B1 * 2/2006 Mullen .................. G06Q 10/06 709/224
7,039,008 B1 5/2006 Howes et al.
8,396,841 B1 * 3/2013 Janakiraman ......... G06F 3/0608 707/802
8,527,544 B1 9/2013 Hayes et al.
8,549,518 B1 10/2013 Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Eric T Loonan
(74) *Attorney, Agent, or Firm* — Vista IP Law Group, LLP

(57) ABSTRACT

Methods, systems, and computer program products for multi-cloud shared data management. A first storage facility on a first cloud is established and a second storage facility on a second cloud established. The first cloud and the second cloud comprise at least respective first deduplication metadata and second deduplication metadata. In response to receipt of a request to store a content object comprising at least one candidate deduplication chunk, an inter-cloud deduplication protocol is initiated. The inter-cloud deduplication protocol determines whether or not a candidate deduplication chunk of a data item is already stored at either the first cloud or the second cloud. In the event that the candidate deduplication chunk of the data item deemed to have been already stored then, rather than storing a further copy of the bit sequence corresponding to the candidate deduplication chunk, instead, merely referring to the location of the already stored candidate deduplication chunk.

24 Claims, 28 Drawing Sheets

(56) References Cited

U.S. PATENT DOCUMENTS

| | | | | |
|---|---|---|---|---|
| 8,577,850 | B1* | 11/2013 | Genda | G06F 3/067 707/692 |
| 8,601,473 | B1 | 12/2013 | Aron et al. | |
| 8,849,767 | B1 | 9/2014 | Zheng et al. | |
| 8,850,130 | B1 | 9/2014 | Aron et al. | |
| 8,863,124 | B1 | 10/2014 | Aron | |
| 8,904,120 | B1 | 12/2014 | Killamsetti et al. | |
| 8,997,097 | B1 | 3/2015 | Aron et al. | |
| 9,009,106 | B1 | 4/2015 | Aron et al. | |
| 9,052,936 | B1 | 6/2015 | Aron et al. | |
| 9,122,641 | B1* | 9/2015 | Gunda | G06F 11/1469 |
| 9,128,626 | B2 | 9/2015 | Chacko | |
| 9,256,374 | B1 | 2/2016 | Aron et al. | |
| 9,256,456 | B1 | 2/2016 | Aron | |
| 9,256,475 | B1 | 2/2016 | Aron et al. | |
| 9,354,912 | B1 | 5/2016 | Aron et al. | |
| 9,389,887 | B1 | 7/2016 | Aron et al. | |
| 9,424,267 | B2 | 8/2016 | Bagal et al. | |
| 9,575,784 | B1 | 2/2017 | Aron et al. | |
| 9,619,257 | B1 | 4/2017 | Aron et al. | |
| 9,652,265 | B1 | 5/2017 | Narayanasamy et al. | |
| 9,772,866 | B1 | 9/2017 | Aron et al. | |
| 9,805,054 | B2 | 10/2017 | Davis et al. | |
| 10,613,761 | B1* | 4/2020 | Zhao | H04L 67/1095 |
| 10,635,639 | B2 | 4/2020 | Khot et al. | |
| 10,700,991 | B2 | 6/2020 | Khinvasara et al. | |
| 11,164,115 | B1 | 11/2021 | Todd et al. | |
| 2008/0097991 | A1 | 4/2008 | Ishikawa et al. | |
| 2009/0271402 | A1 | 10/2009 | Srinivasan et al. | |
| 2010/0333116 | A1* | 12/2010 | Prahlad | G06F 16/41 713/153 |
| 2011/0055471 | A1 | 3/2011 | Thatcher et al. | |
| 2011/0191522 | A1 | 8/2011 | Condict et al. | |
| 2013/0091102 | A1 | 4/2013 | Nayak | |
| 2013/0339319 | A1 | 12/2013 | Woodward et al. | |
| 2014/0006363 | A1 | 1/2014 | Constantinescu et al. | |
| 2014/0143213 | A1 | 5/2014 | Tal et al. | |
| 2015/0142749 | A1 | 5/2015 | Broll et al. | |
| 2016/0070652 | A1 | 3/2016 | Sundararaman et al. | |
| 2016/0321290 | A1 | 11/2016 | Luthra et al. | |
| 2017/0039218 | A1 | 2/2017 | Prahlad et al. | |
| 2017/0228247 | A1 | 8/2017 | Aron et al. | |
| 2018/0081821 | A1 | 3/2018 | Beaverson et al. | |
| 2019/0245918 | A1* | 8/2019 | Xu | H04L 63/0869 |
| 2020/0026781 | A1* | 1/2020 | Khot | G06F 16/164 |
| 2020/0034451 | A1 | 1/2020 | Danilov et al. | |
| 2020/0133544 | A1* | 4/2020 | Slater | G06F 3/0641 |
| 2022/0083250 | A1* | 3/2022 | Gupta | G06F 3/0644 |
| 2024/0045839 | A1 | 2/2024 | Haggerty et al. | |
| 2024/0289345 | A1 | 8/2024 | Kotni et al. | |
| 2025/0252101 | A1 | 8/2025 | Shah et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Li, M., et al., "CDStore: Toward Reliable, Secure, and Cost-Efficient Cloud Storage via Convergent Dispersal," dated 2015, USENIX Annual Technical Conference.
Naresh, V., et al., "Content based Hash Indexing Approach to Handle Data Deduplication over Cloud Data," International Journal of Advances in Engineering and Management (IJAEM) vol. 4, Issue Jun. 6, 2022, pp. 879-885.
Abu-Libdeh, H., et al., "RACS: A Case for Cloud Storage Diversity," SoCC'10, Jun. 10-11, 2010, Indianapolis, Indiana, USA. Copyright 2010 ACM 978-1-4503-0036-0/10/06.
Papaioannou, T., et al., "Scalia: An Adaptive Scheme for Efficient Multi-Cloud Storage," SC12, Nov. 10-16, 2012, Salt Lake City, Utah, USA 978-1-4673-0806-9.
Lalitha, B. et al., "Implementing deduplication technique for RDF files with enhanced security using multi cloud servers," 2017 International Conference on Energy, Communication, Data Analytics and Soft Computing (ICECDS), dated Aug. 2017.
Poitras, Steven. "The Nutanix Bible" (Apr. 27, 2023), from https://www.nutanixbible.com/pdf/classic.pdf (Publication date based on updated doc publication date; first publication date unknown).
Poitras, Steven. "The Nutanix Bible" (May 21, 2024), from https://www.nutanixbible.com/pdf/classic.pdf (Publication date based on updated doc publication date; first publication date unknown).
Wikipedia. "Data deduplication". Mar. 11, 2017. 6 pages.
Wikipedia. "Reference counting". Feb. 7, 2017. 9 pages.
U.S. Appl. No. 15/071,488, filed Mar. 16, 2016. 46 pages.
U.S. Appl. No. 13/207,375, filed Aug. 10, 2011. 45 pages.
Kotla, R., et al., "SafeStore: A Durable and Practical Storage System," dated Jun. 2007, USENIX Annual, USENIX Association Technical Conference.
Fu, Y., et al., "Distributed Data Deduplication for Big Data: A Survey," ACM Comput. Surv., vol. 58, No. 3, Article 66. Publication date: Sep. 2025.
Sirenko, A., "CreateVolume (StorageClass) Parameters," github, URL: https://github.com/kubernetes-sigs/aws-ebs-csi-driver/blob/master/docs/parameters.md, dated May 14, 2025.

(56) References Cited

OTHER PUBLICATIONS

Amin, S., et al., "Best practices for Amazon RDS for SQL Server with Amazon EBS io2 Block Express volumes up to 64 TiB," AWS Database Blog, URL: https://aws.amazon.com/blogs/database/best-practices-for-amazon-rds-for-sql-server-with-amazon-ebs-io2-block-express-volumes-up-to-64-tib/, dated Jul. 30, 2024.

* cited by examiner

PE1
PE2
PE9
VM
S1
S2
S9
Cluster 101
FIG. 1A1
C
B
Cluster with Controller 102
FIG. 1A2
B1
C1
C2
B2
AZ1
AZ2
Multiple Clusters
FIG. 1A3
1B00
Data Warehouse 105
DWC1
DWC2
Multi-cloud Shared Data $103_1$
Multi-cloud Shared Data $103_2$
Inter-cloud Protocol 109
Cloud1
Cloud2
Region1
Region2
Legend
Logical Construct
Physical Construct
Data Producer-Consumer 111

DATA WAREHOUSE CONFIGURATION SCREEN

Warehouse Name: BigCoGlobal

Member1: {Cloud1, DWC1, B1}

Member2: {Cloud2, DWC2, B2}

⋮

Member9: {Cloud9, DWC9, {B9A, B9B}}

Member Configuration 107

Protocol Handler: PH

Protocol Plug-in Library: {PL1, PL2, …, PL9}

Multi-vendor Inter-cloud Protocol Specification 113

Check Setup

Data Warehouse Configuration Repository 152

1F00

| ruleID | usageIndicator | deletionFlag | action(s) |
|---|---|---|---|
| r1 | in-use | do-not-delete | <null> |
| r2 | in-use | delete | set fingerprint.deletionFlag=do-not-delete |
| r3 | not-in-use | do-not-delete | set fingerprint.deletionFlag=delete |
| r4 | not-in-use | delete | delete fingerprint.data and fingerprint.metadata |

338
Detect a data unit ingest operation invoked from a computing resource

340
Generate a fingerprint for the data unit

342
Fingerprint exists?

Yes

No

348
Store the data unit in physical storage $350_1$
Generate a map entry in the data item metadata of the computing resource to map the data unit fingerprint to the data unit physical storage location 352
Create a deletion flag in dedupe metadata associated with the data unit fingerprint 354
Set the deletion flag to a `do-not-delete` state 344
Map entry exists?

Yes

No $350_2$
Generate a map entry in the data item metadata of the computing resource to map the data unit fingerprint to the data unit physical storage location 356
`delete` state set?

Yes

No

Loop

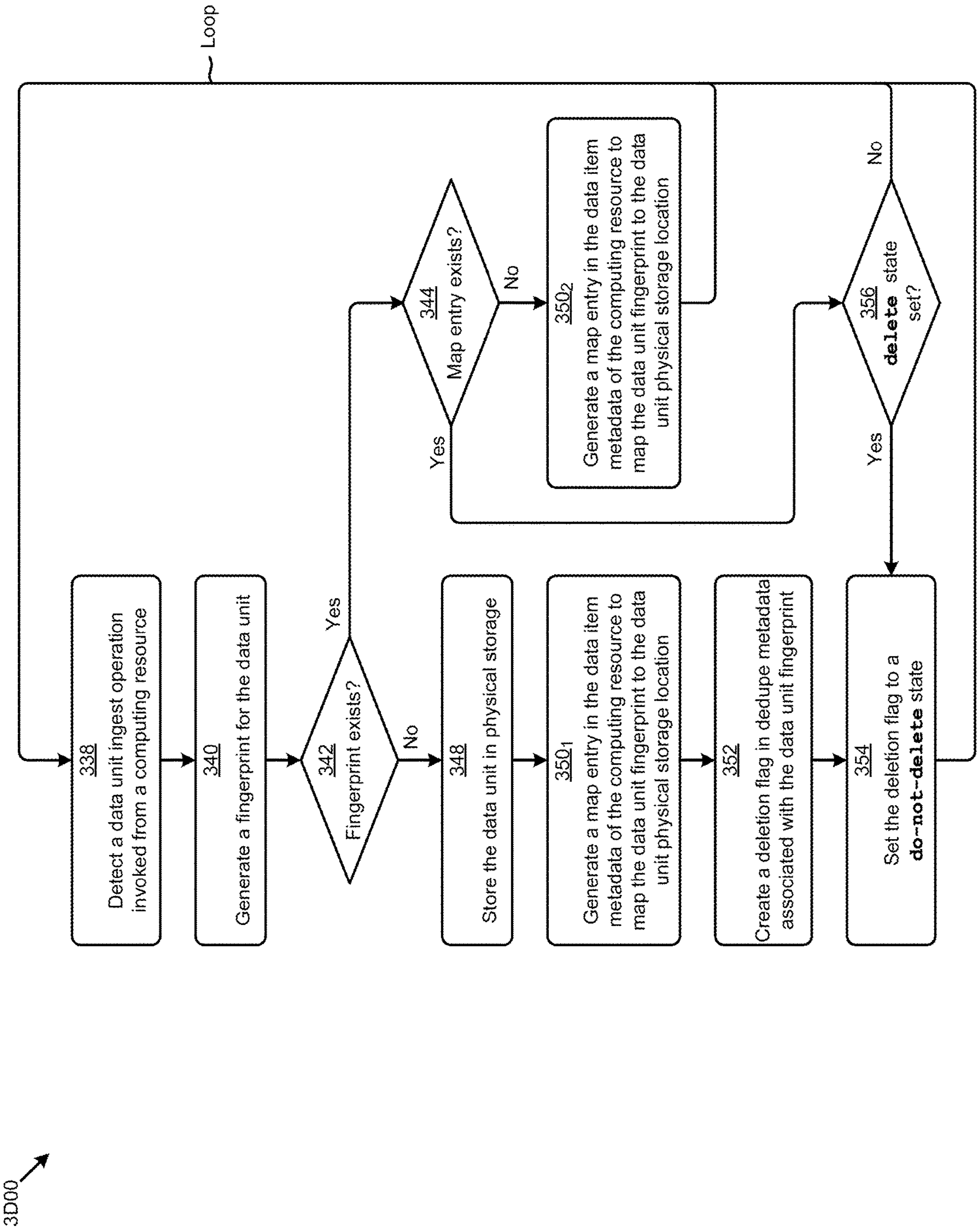

FIG. 3D

502
Enumerate the data unit fingerprints in the dedupe metadata

FOR EACH data unit fingerprint:

504
Scan the data item metadata for map entries associated with data unit fingerprint 506
Any map entries?

Yes

No

508
`delete` state?

Yes

No

510
Invoke deduped data management operation(s) to delete the data unit and its dedupe metadata entry 512
Set the deletion flag of the data unit fingerprint to a `delete` state in the dedupe metadata entry 514
Record a count of the map entries for statistical analyses

END FOR

Dynamic Deduped Data Management Loop

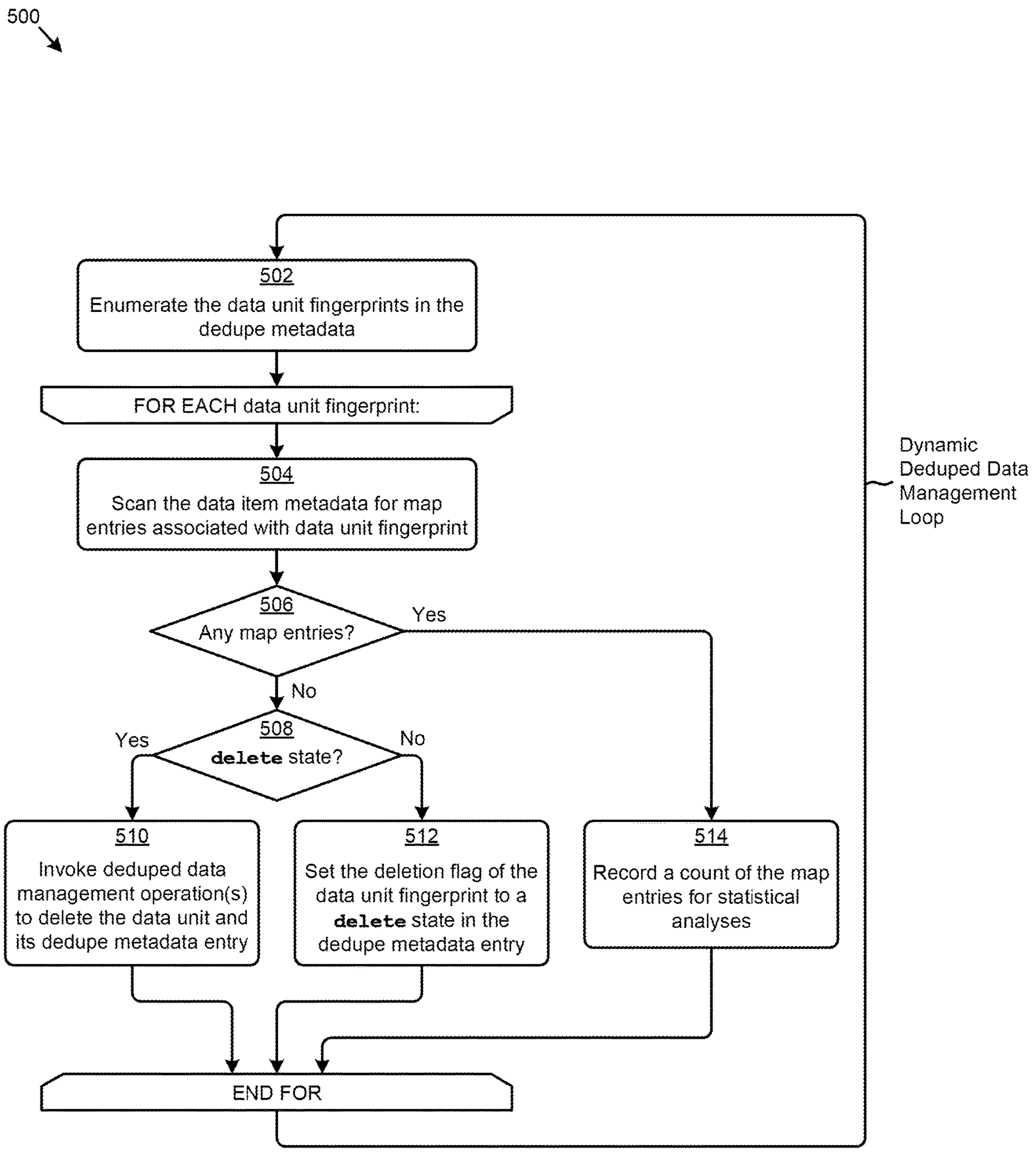

FIG. 5

INTER-CLOUD SHARED CONTENT DATA MANAGEMENT

TECHNICAL FIELD

This disclosure relates to shared data management, and more particularly to techniques for inter-cloud shared content data management.

BACKGROUND

Use of infrastructure-as-a-service (IaaS) entities such as public clouds has now become commonplace. Historically, computing cluster operators have relied on the elastic nature of IaaS clouds (e.g., public clouds, hybrid clouds, etc.) to temporarily expand resources (e.g., computing capabilities, data storage, and networking bandwidth) "on demand" (e.g., when there is, or when there is predicted to be, a need for increased resources). When the temporary demand has been satisfied and/or when the temporary demand subsides, then the temporarily demanded resources can be released back to the IaaS provider. This model has been so successful that many IaaS providers are now competing for the opportunities. This has brought about an explosion of features and capabilities as each IaaS entrant attempts to serve the needs of what the different IaaS provider believes to be their respective niche in the overall marketplace.

Over time, computing cluster operators have come to understand the various feature differences between different IaaS providers. Furthermore, computing cluster operators have come to understand the relative strengths and weaknesses of different IaaS providers. In some situations sometimes due to feature availability and/or sometimes due to usage models held out by the particular IaaS providers—it behooves the computing cluster operators to judiciously select one IaaS provider over another IaaS provider based on the computing cluster operator's specific needs. In many cases, the totality of needs of the computing cluster operators is such that a single computing cluster operator engages with multiple different IaaS providers, where each different IaaS provider is selected based on the offerings of the different particular IaaS provider. For example, a computing cluster operator might decide to use public cloud provider #1 because it offers low latency access to long-term storage (e.g., low latency access to large blobs of data such as executables), whereas the same computing cluster operator might use a different public cloud provider because it offers extremely secure long term storage (e.g., long term "five nines" storage of backups and other large volumes of data).

In situations such as the foregoing example, and in other situations as well, even though the computing cluster operators have made a good choice in the selection of the multiple IaaS providers (e.g. for the reasons cited above or for other reasons), the computing cluster operators are left with a data management nightmare.

When multiple IaaS providers are engaged to augment the capabilities of the computing cluster operator (e.g., for the foregoing reasons), it turns out that each IaaS provider supports only their own mechanisms for data storage and access.

Unfortunately, this leaves it to the computing cluster operator to solve the problem of how to support multiple different infrastructure-as-a-service provider's mechanisms in a manner that is consistent with the computing cluster operators' infrastructure. This scenario is exacerbated when it emerges that the IaaS providers have different IaaS data entity representation schema that need to be reconciled. This scenario is still further exacerbated when it emerges that human intervention is needed to manage stored data that is distributed across multiple vendor's offerings. This scenario is even still further exacerbated when it comes to wasteful maintenance of multiple copies of the same data. That is, one IaaS vendor might not know anything about a particular tenant's storage on some other infrastructure, and thus cannot help to reduce or eliminate wasteful maintenance of multiple copies of the same data on two (or more) different public cloud sites.

What is needed is a way or ways to be able to manage storage that is situated on different infrastructure-as-a-service entities. The problem to be solved is therefore rooted in various technological limitations of legacy approaches. Improved technologies are needed. In particular, improved applications of technologies are needed to address the aforementioned technological limitations of legacy approaches.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and computer program products for inter-cloud shared content data management, which techniques advance the relevant technologies to address technological issues with legacy approaches. More specifically, the present disclosure describes techniques used in systems, methods, and in computer program products for content management services for infrastructure-as-a-service entities. Certain embodiments are directed to technological solutions for deployment of a feature-rich data warehouse that federates different infrastructure-as-a-service vendors.

The disclosed embodiments modify and improve beyond legacy approaches. In particular, the herein-disclosed techniques provide technical solutions that address the technical problems attendant to the need for reconciliation of data management features between different infrastructure-as-a-service vendors. Such technical solutions involve specific implementations (e.g., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication.

For example, when performing computer operations that address the various technical problems underlying the need for reconciliation of storage features between different infrastructure-as-a-service vendors, both memory usage and CPU cycles demanded are significantly reduced as compared to the memory usage and CPU cycles that would be needed but for practice of the herein-disclosed techniques for deployment of a feature-rich data warehouse that federates different IaaS vendors. Strictly as one case, the data structures as disclosed herein and their use serve to reduce both memory usage and CPU cycles as compared to alternative approaches. Moreover, information that is received during operation of the embodiments is transformed by the processes that store data into and retrieve data from the aforementioned data structures. For example, when using the herein-disclosed techniques for data federation and movement, multiple hops (e.g., more than one hop) through the various multiple networking infrastructures of multiple computing sites are avoided.

The ordered combination of steps of the embodiments serve in the context of practical applications that perform steps for deployment of a feature-rich data warehouse that federates different infrastructure-as-a-service vendors more efficiently by synchronizing metadata without the use of semaphores. As such, techniques for deployment of a feature-rich data warehouse that federates different IaaS vendors overcome long-standing yet heretofore unsolved technological problems that arise from differences between different infrastructure-as-a-service vendors.

Many of the herein-disclosed embodiments implement a feature-rich data warehouse that federates different IaaS vendors. These technological solutions pertain to technological problems that arise in the hardware and software arts that underlie infrastructure-as-a-service offerings. Aspects of the present disclosure achieve performance and other improvements in peripheral technical fields including, but not limited to, high performance computing and distributed storage systems.

Some embodiments include a sequence of instructions that are stored on a non-transitory computer readable medium. Such a sequence of instructions, when stored in memory and executed by one or more processors, causes the one or more processors to perform a set of acts for deployment of a feature-rich data warehouse that federates different infrastructure-as-a-service vendors.

Some embodiments include the aforementioned sequence of instructions that are stored in a memory, which memory is interfaced to one or more processors such that the one or more processors can execute the sequence of instructions to cause the one or more processors to implement acts for deployment of a feature-rich data warehouse that federates different infrastructure-as-a-service vendors.

In various embodiments, any combinations of any of the above can be organized to perform any variation of elements or acts that singly, or in combination implement content management services across disparate IaaS entities. Many combinations of aspects of the above elements or acts are contemplated.

Further details of aspects, objectives and advantages of the technological embodiments are described herein and in the figures and claims.

BRIEF DESCRIPTION OF THE DRAWINGS

The drawings described below are for illustration purposes only. The drawings are not intended to limit the scope of the present disclosure.

FIG. 1A1, FIG. 1A2, and FIG. 1A3 exemplify computing cluster architectures.

FIG. 2 is a diagram showing a data flow that implements policy-based data deduplication services across infrastructure-as-a-service entities, according to an embodiment.

FIG. 3D illustrates a deduplicated data status tracking technique as used to implement data unit deduplication services across disparate infrastructure-as-a-service entities, according to an embodiment.

FIG. 5 depicts a deduplicated data management technique as implemented across disparate infrastructure-as-a-service entities, according to an embodiment.

DETAILED DESCRIPTION

Figure 1B:
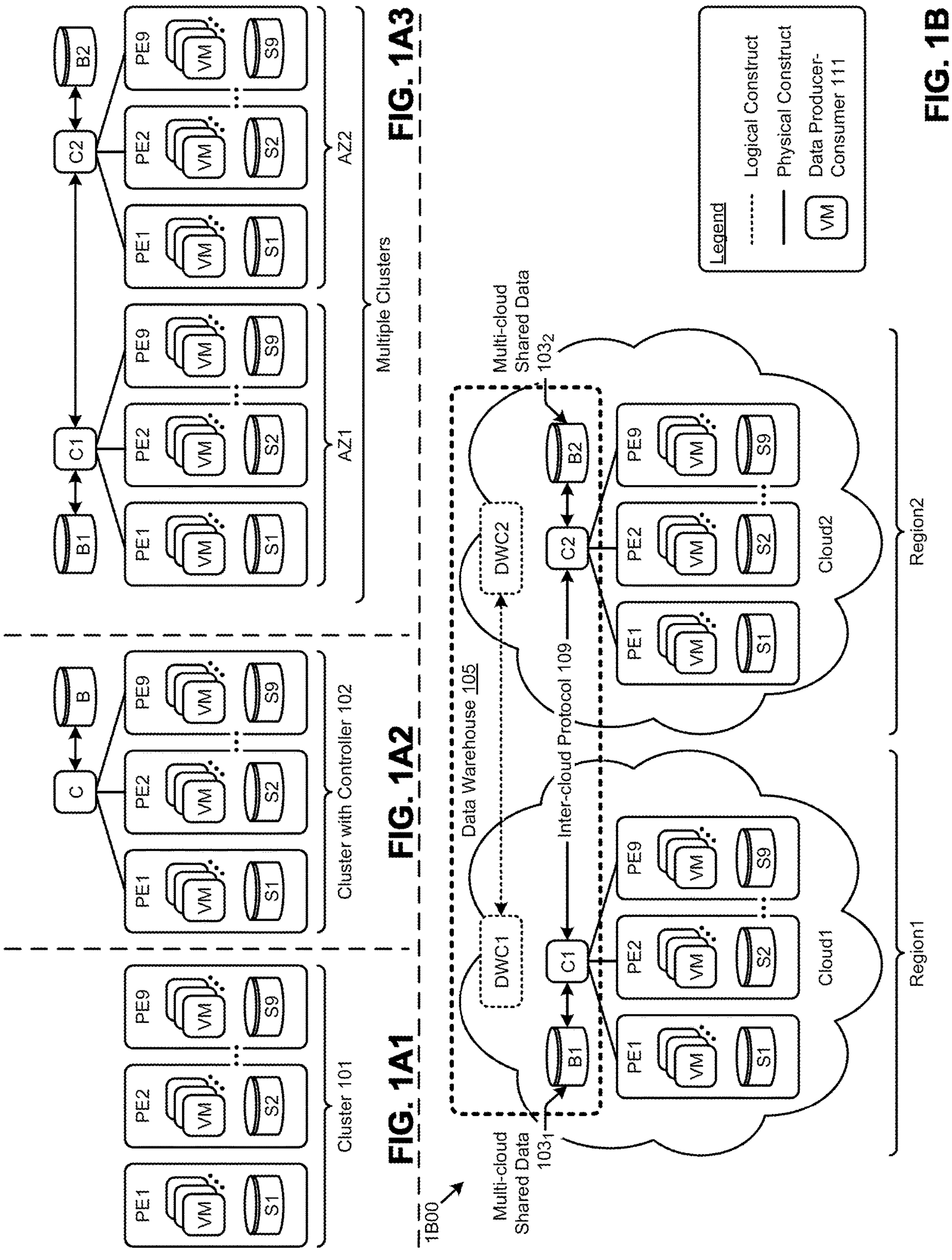
FIG. 1B exemplifies a data warehouse configuration that spans multiple infrastructure-as-a-service entities, according to an embodiment.

Aspects of the present disclosure solve problems associated with federating storage features between different infrastructure-as-a-service (IaaS) providers. Some embodiments are directed to approaches for deployment of a feature-rich data warehouse that federates feature offerings from different IaaS vendors. The accompanying figures and discussions herein present example environments, systems, methods, and computer program products for content deduplication services that are carried out by and between disparate infrastructure-as-a-service providers.

Overview

Different storage facilities often have correspondingly different features. For example, an on-premises storage facility might implement a first set of storage features, whereas a cloud provider (or other IaaS provider) might implement a second, different set of storage features. This creates an unwanted Tower of Babble scenario, where the two different types of infrastructure "don't speak the same language" and therefore cannot communicate with each other. Strictly as one example, an on-premises storage facility might handle data-at-rest differently than a sought-after cloud environment. In modern times, this unwanted scenario occurs quite frequently, especially when considering the rapid adoption of virtualization systems. Virtualization systems rely on many types of data-at-rest entities, including virtual machine images, virtual disk images, virtual machine archives, system upgrade bundles, and/or various types of READ-ONLY binary content of significance to user environments. The lack of storage features offered by and/or between IaaS providers leads to performance, usability and platform integration issues for the user.

What is needed are ways to provide high-performance and highly-reliable IaaS storage capabilities. What is needed are ways to managing content in a distributed IaaS backend environment in a manner that can easily adapt and integrate with other IaaS platforms. As just one example, higher performance can be achieved by removing multi-hop data movement between IaaS providers. Further, the technical advances as disclosed herein simplify cross-instance and cross-boundary inventory management by defining a new logical entity called a data warehouse. Deployment of a data warehouse simplifies distributed content lifecycle management even in the face of multi-tenant environments. Still further, the technical advances disclosed herein facilitate use of vendor-specific storage offerings. Such advances can be deployed in any architecture, and/or for any purpose including, but not limited to on-premises cluster expansion, remote-office-branch-office (ROBO) settings, hybrid cloud content management, and inter-cloud content management.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiment even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1, FIG. 1A2, and FIG. 1A3 exemplify computing cluster architectures. FIG. 1A1 depicts a cluster 101 formed of independent computers (e.g., processing element PE1, processing element PE2, . . . , processing element PE9). Each independent computer has at least one processing element (e.g., a CPU or a core of a CPU and CPU-accessible memory) that is capable of executing code (e.g., the virtual machines shown as VMs). Moreover, each independent computer has its own independent storage devices (e.g., storage S1, storage S2, . . . , storage S9). The data that is stored on any of the foregoing independent storage devices can be accessed by any processing unit that is capable of executing code. As such, this technique for sharing data comports with the computer science definition of a computing cluster.

Figure 1C:
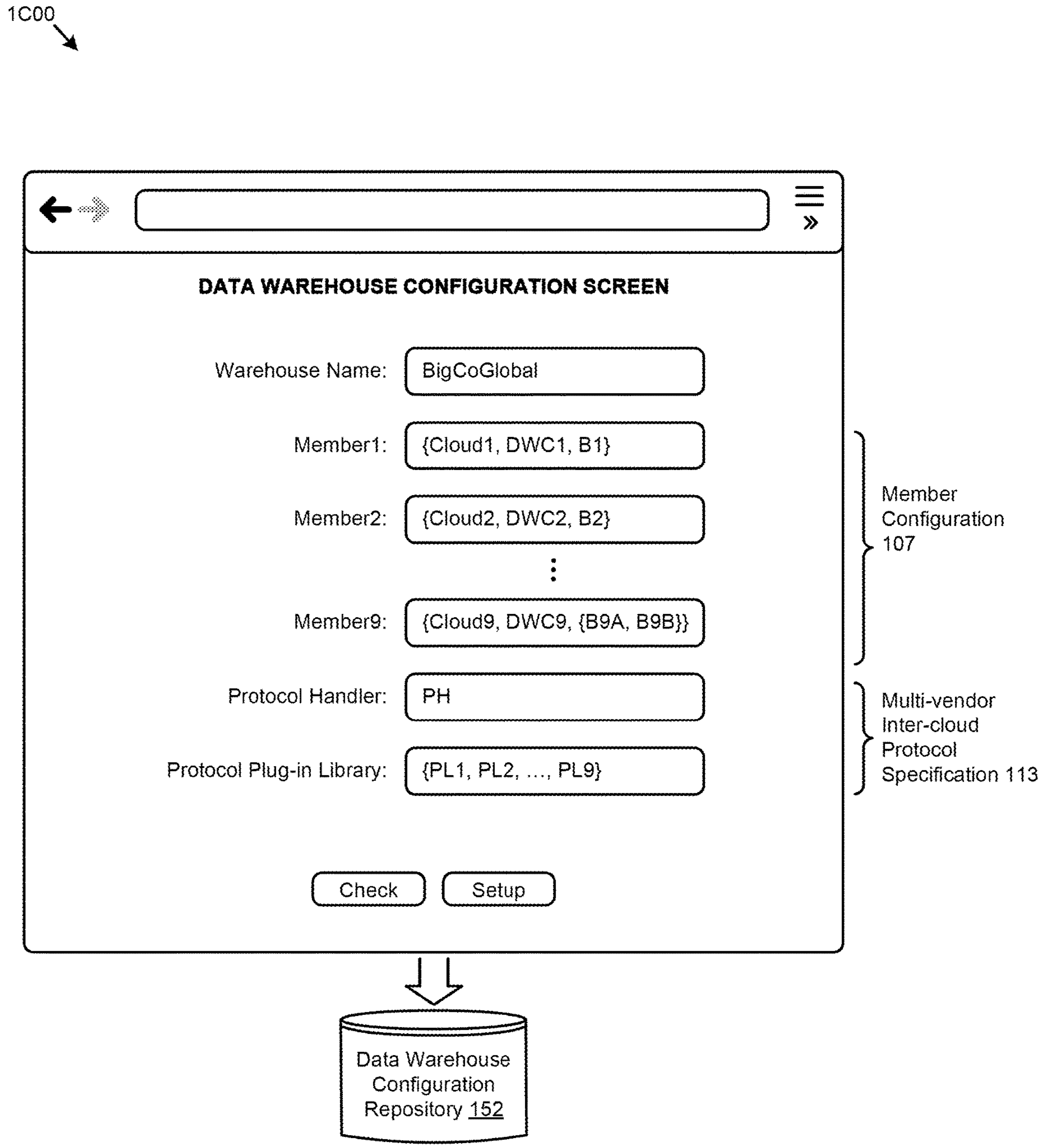
FIG. 1C depicts a graphical user interface for defining a data warehouse that supports content management services by and between a plurality of infrastructure-as-a-service entities, according to an embodiment.
Figure 1D:
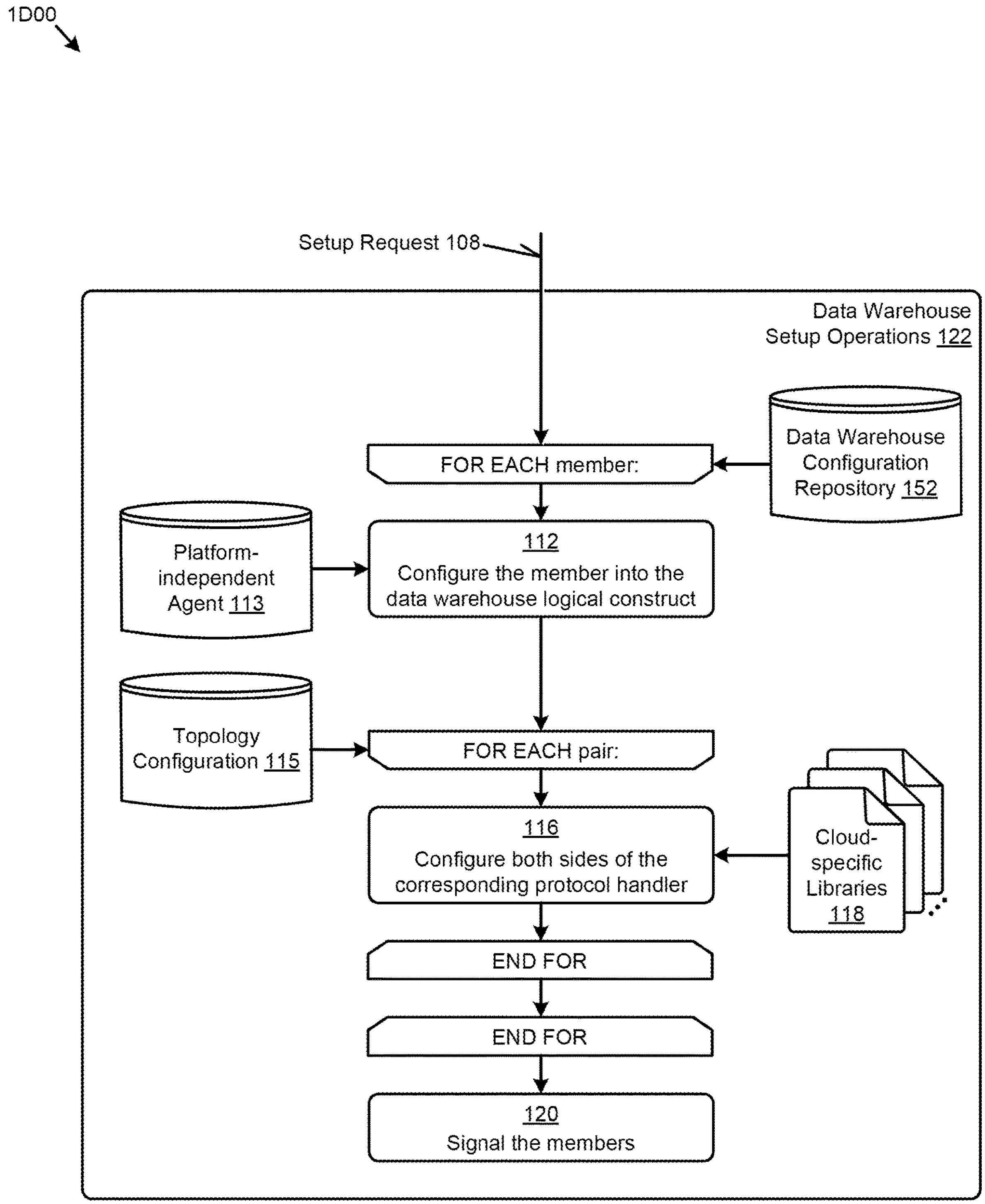
FIG. 1D depicts a data warehouse setup flow for configuring a data warehouse that supports content management services by and between a plurality of infrastructure-as-a-service entities, according to an embodiment.
Figure 1E:
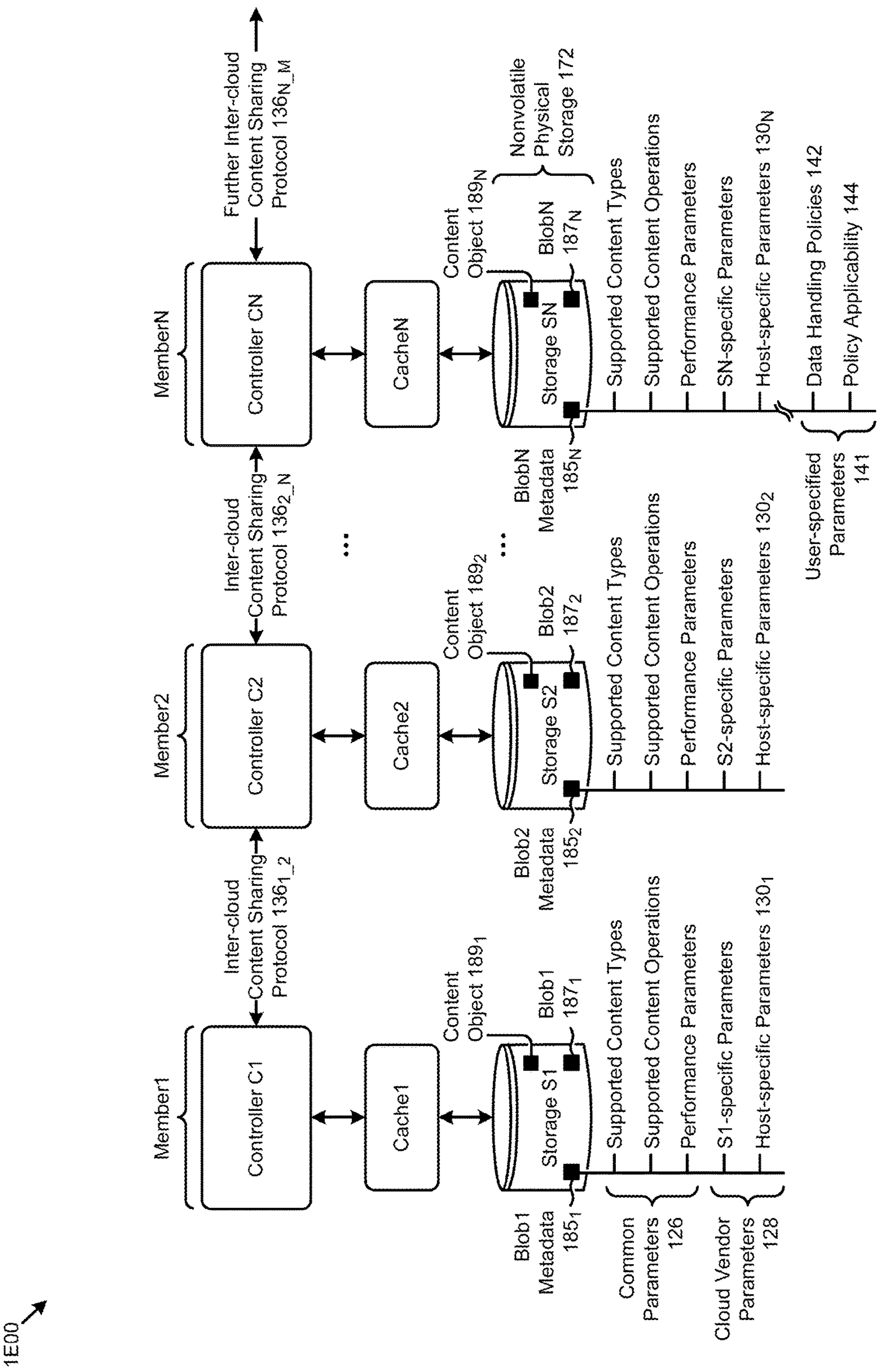
FIG. 1E depicts inter-cloud communications as used for high-performance object sharing between a plurality of vendor-specific IaaS entities, according to an embodiment.
Figure 1F:
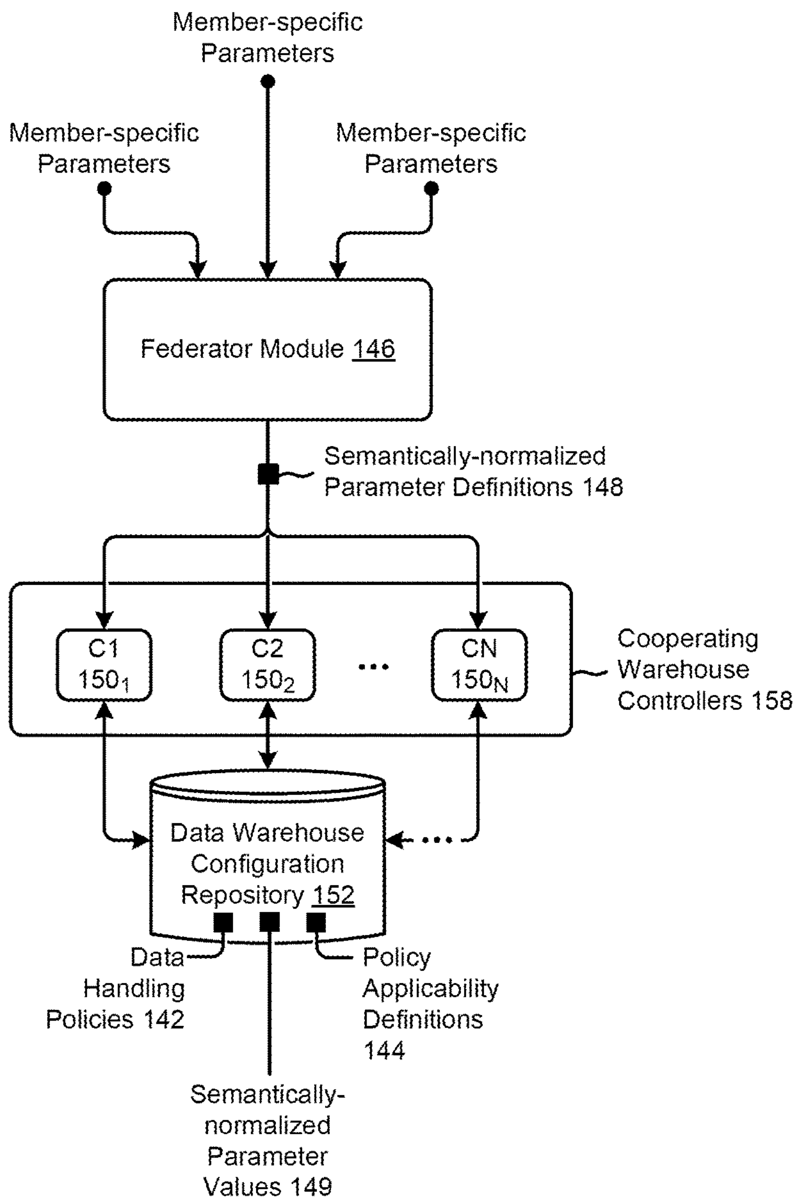
FIG. 1F depicts inter-cloud parameter federation as used for translating between a plurality of vendor-specific content object storage facilities, according to an embodiment.
Figure 1G:
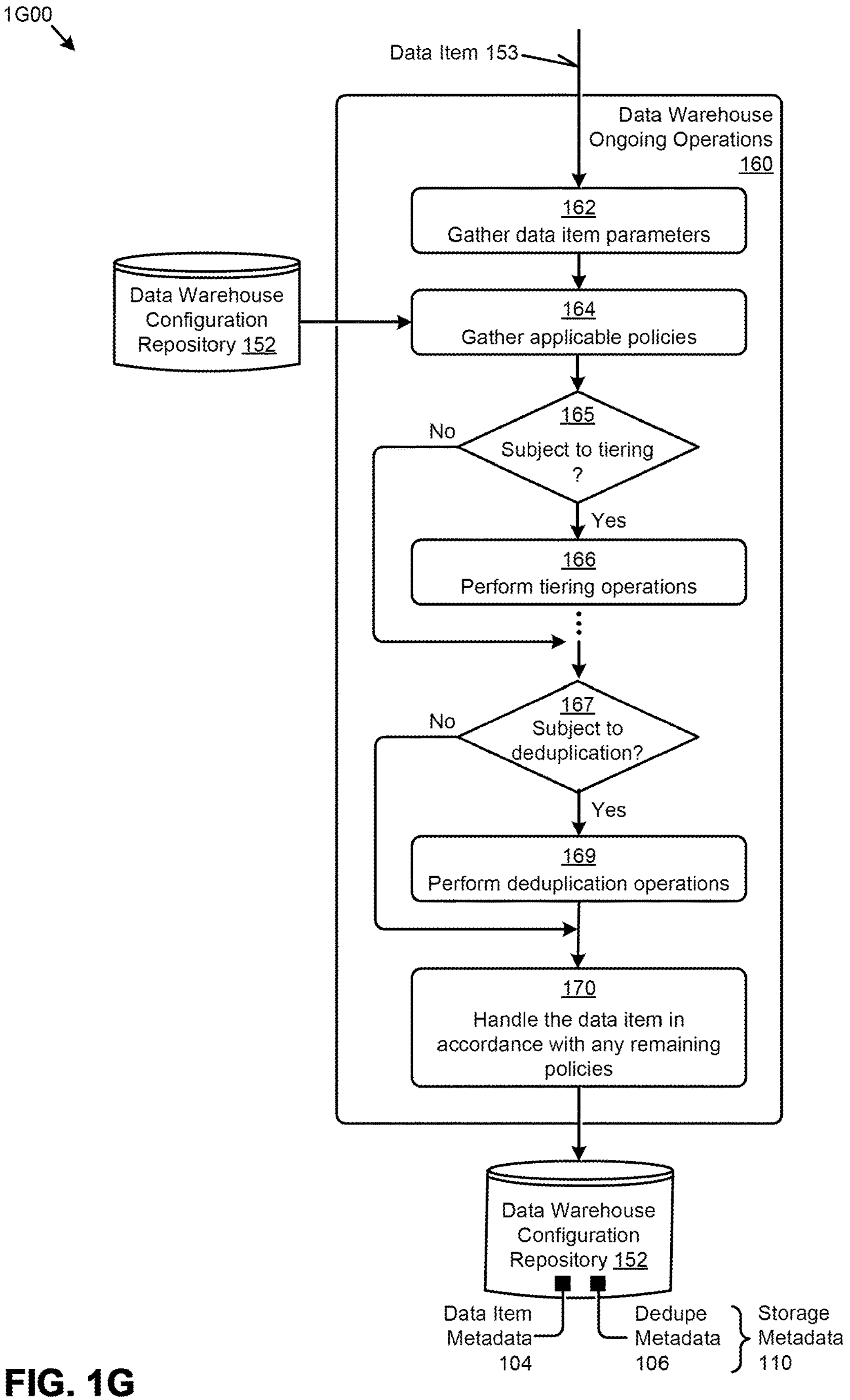
FIG. 1G depicts an ongoing operation flow for maintaining a data warehouse in accordance with one or more storage policies, according to an embodiment.
Figure 1H:
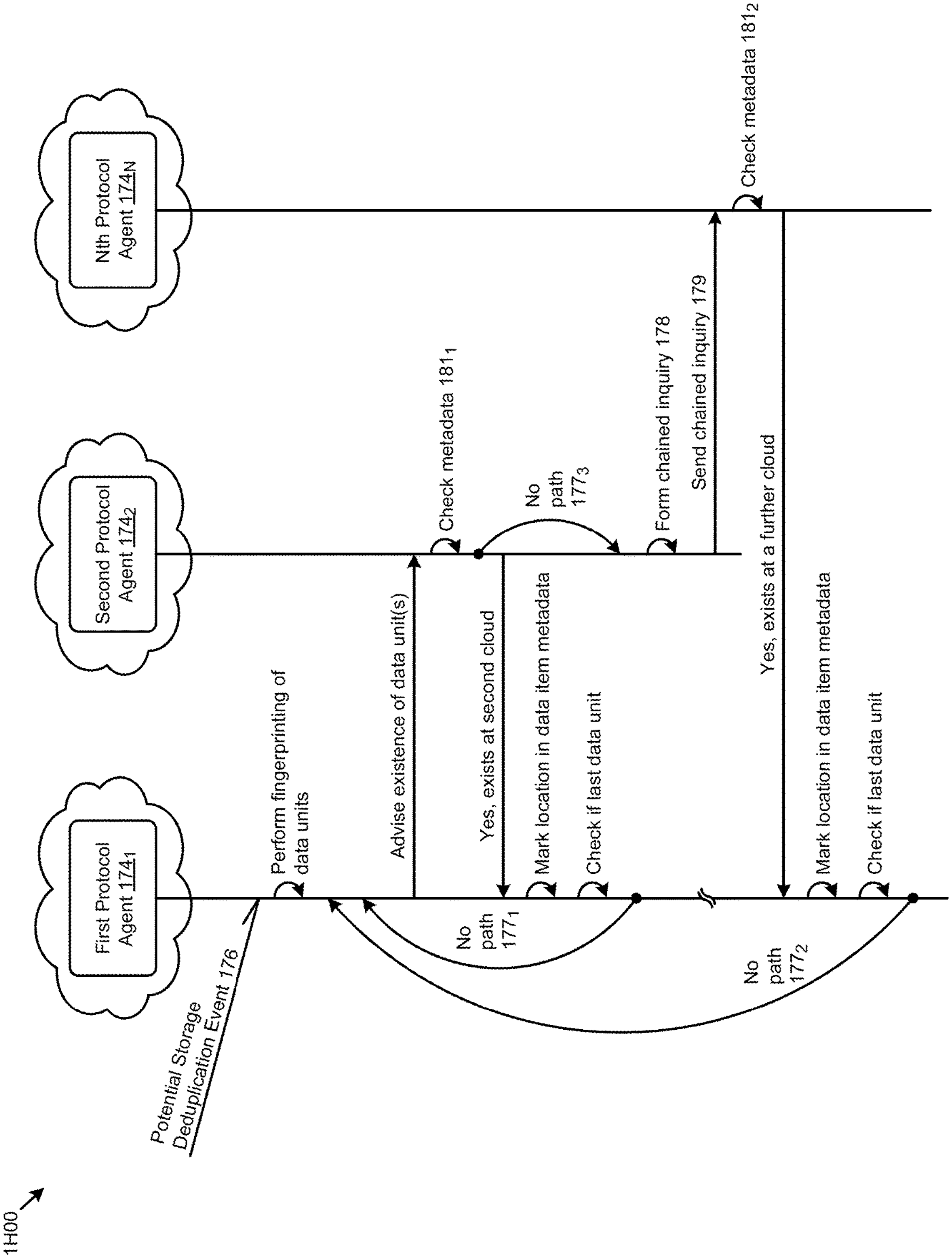
FIG. 1H depicts a data warehouse maintenance protocol for maintaining a data warehouse in accordance with one or more storage deduplication policies, according to an embodiment.
Figure 2:
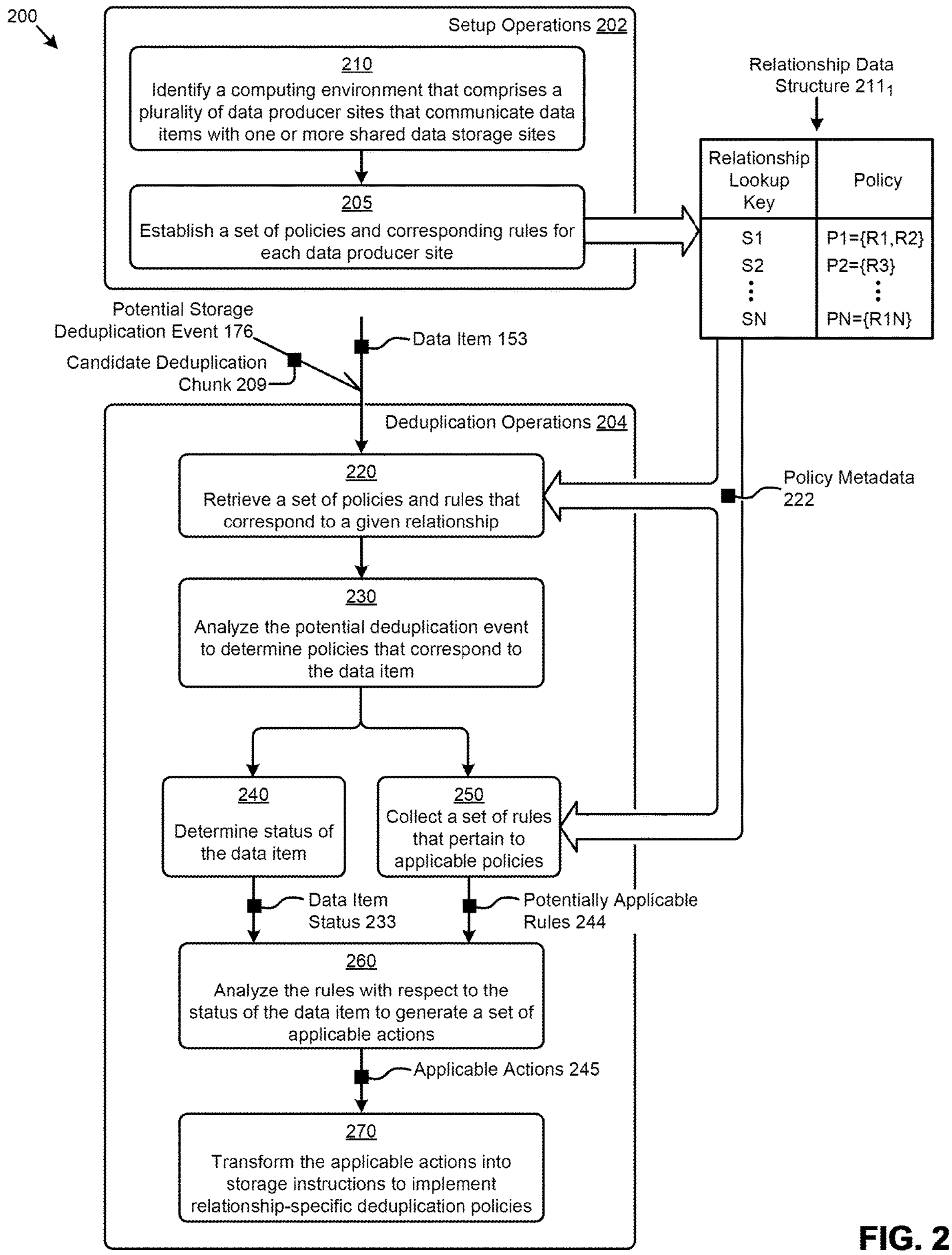

FIG. 1A2 advances over the computer cluster of FIG. 1A1 by adding a controller "C" that is able to carry out communication with any of the processing elements (e.g., processing element PE1, processing element PE2, . . . , processing element PE9). As such, the architecture of FIG. 1A2 implements a cluster with controller 102. An architecture comprising multiple clusters can be formed of two or more instances of a cluster with controller 102. In some cases, and as shown in FIG. 1A3, different instances of instances of a cluster with controller are situated in different availability zones (availability zone AZ1, availability zone AZ2). Different availability zones may correspond to different geographies or regions (e.g., North America, Asia, Europe, etc.), or different availability zones may correspond to different data centers, or different availability zones may correspond to different power generation facilities, etc.

In some deployment scenarios, such as is shown in FIG. 1A3, the cluster and controller configurations that are deployed into different availability zones might be identical or nearly identical copies of each other (e.g., in a hot tandem configuration). In other configurations, the cluster and controller configurations might be different, where the VMs running under a first controller are different from the VMs running under a second controller. Moreover, the cluster and controller configurations might be hosted by different IaaS vendors where respective data storage facilities (e.g., blob storage facilities such as blob storage B1, blob storage B2) are also different (e.g., vendor-specific).

It is in this latter case—where different instances of cluster and controller configurations might be hosted by different IaaS vendors—that data management problems begin to arise. Specifically, at least since in many cases, there are differences between the shown multi-cloud shared data 103$_1$ of cloud1 (see FIG. 1B) and the shown multi-cloud shared data 103$_2$ of cloud2 (see FIG. 1B), it emerges that there needs to be some way to federate the differences.

Disclosed herein are a panoply of ways to federate the differences between vendor-specific storage facilities. Moreover, disclosed herein are an array of ways to maintain high-performance and high availability of distributed data despite differences between vendor-specific storage facilities across which data is distributed.

One way to federate the differences between vendor-specific storage facilities is to implement a data warehouse. One illustrative configuration of such a data warehouse is shown and described as pertains to FIG. 1B.

FIG. 1B exemplifies a data warehouse configuration that spans multiple infrastructure-as-a-service entities. As an option, one or more variations of data warehouse configuration 1B00 or any aspect thereof may be implemented in the context of the architecture and functionality of the embodiments described herein and/or in any environment.

The figure is being presented to illustrate how a data warehouse might be configured to operate in an environment that spans multiple clouds. As shown, data warehouse 105 is a logical construct that spans across cloud1 of region1 and cloud2 of region2. As shown, the data warehouse includes the logical construction of a data warehouse boundary as well as cluster-specific data warehouse controllers (e.g., data warehouse controller DWC1 and data warehouse controller DWC2). These cluster-specific data warehouse controllers can be logical controllers (as shown) that are implemented using any available computing resource, or these cluster-specific data warehouse controllers can be physical controllers that are implemented within or aside of the shown cluster controller C1 or cluster controller C2.

The specific partitioning of any one or more data warehouse controllers notwithstanding, each data warehouse controller, possibly in coordination with a respective cluster controller, can carry on an inter-cloud protocol 109, which inter-cloud protocol serves, in part, to federate differences between multi-cloud shared data 103$_1$ of cloud1 and multi-cloud shared data 103$_2$ of cloud2. As such, data residing on multi-cloud shared data 103$_1$ of cloud1 can be accessed by controller C2 of cloud2 (e.g., using the inter-cloud content sharing protocol 136$_{1\_2}$), and data residing on multi-cloud shared data 103$_2$ of cloud2 can be accessed by controller C1 of cloud1. Similarly, data residing on a further cloud can be accessed by controller C2 of cloud2 (e.g., using the inter-cloud content sharing protocol 136$_{1\_2}$), and data residing on multi-cloud shared data 103$_2$ of cloud2 can be accessed by controller C1 of cloud1.

In such a configuration, any data producer-consumer 111 (e.g., any process or virtual machine running on any infrastructure of either cloud1 or cloud2) can share data across regions.

Although FIG. 1B depicts merely two clouds distributed across two regions, any number of clouds and/or any number of other infrastructure instances can be configured into a data warehouse. One technique for configuring a data warehouse is shown and described as pertains to FIG. 1C.

FIG. 1C depicts a graphical user interface for defining a data warehouse that supports content management services by and between a plurality of infrastructure-as-a-service entities. As an option, one or more variations of graphical user interface 1C00 or any aspect thereof may be implemented in the context of the architecture and functionality of the embodiments described herein and/or in any environment.

The shown graphical user interface 1C00 can be used to configure any number of data warehouses involving any number of members. In this example, a data warehouse named "BigCoGlobal" is configured with 9 members (e.g., member1, member2, . . . , member9) into member configuration 107. A protocol handler "PH" is identified and is then configured to access a particular set of plug-ins (e.g., plug-in PL1, plug-in PL2, . . . , plug-in PL9), so as to implement a multi-vendor inter-cloud protocol specification 113. Each plug-in is configured to be able to discover the topology of a data warehouse, and is further configured to be able to self-assemble its own instantiating protocol handler. As shown, the data warehouse configuration screen includes a "Check" button that serves to check that each member is able to communicate with each other member in accordance with the discovered topology. When such a check passes, then the configuration can be saved (e.g., into a data warehouse configuration repository 152). Further, when a configuration is saved, a setup request can be issued and the members of the data warehouse configuration can be instantiated, and then interconnected into a user-specified (or default) topology.

The foregoing setup request can be fielded by any one or more agents that are configured to carry out a data warehouse setup flow. One possible data warehouse setup flow is shown and described as pertains to FIG. 1D.

FIG. 1D depicts a data warehouse setup flow for configuring a data warehouse that supports content management services by and between a plurality of IaaS entities. As an option, one or more variations of data warehouse setup flow 1D00 or any aspect thereof may be implemented in the context of the architecture and functionality of the embodiments described herein and/or in any environment.

The figure is being presented to illustrate one embodiment of a data warehouse setup flow can be carried out by proceeding through a set of data warehouse setup operations 122. In this embodiment, the data warehouse setup operations commence upon receipt of a setup request 108. A FOR EACH iteration block contains a further FOR EACH iteration block. Specifically, for each member that is specified for a particular named data warehouse, that member is initially configured (step 112) before control passes to a nested FOR EACH loop where, for each pair of members, both sides of a protocol handler (e.g., corresponding to both members of a pair) are configured (step 116). Any number of members can be interconnected with any other members. In some cases, a single member is connected to two or more members.

As can be understood by one of skill in the art, there are many possible topologies (e.g., a daisy chain topology, a hub-and-spoke topology, a ring topology, etc.). In this embodiment, a particular topology (e.g., topology configuration 115) is given as a connectivity graph comprising nodes and edges. Pairs of nodes that are connected by edges can thusly be enumerated such that an appropriate plug-in can be configured at each end of an edge. That is, a particular plug-in that is to be configured at each end of an edge is selected based on the nature and configuration of the node at that end of the edge. In exemplary embodiments, protocol handler plug-ins are drawn from cloud-specific libraries 118, possibly distributed as cloud-specific or interface-specific plug-ins. For example, when interfacing a member of a first cloud to a member of a second cloud, a first cloud-specific library pertaining to the first cloud is accessed to draw a first protocol handler plug-in for the end of the protocol handler on the side of the first cloud, whereas a second cloud-specific library pertaining to the second cloud is accessed to draw a second protocol handler plug-in for the end of the protocol handler on the side of the second cloud.

Also, as known in the art, different topologies facilitate different operational characteristics. For example, a hub-and-spoke topology might be selected so as to implement a one-hop maximum requirement. As another example, specific certain members can be interconnected with multiple protocol handlers so as to implement a high-availability requirement and/or to provide separate protocol handlers for different storage devices. An example of this latter case is depicted in FIG. 1C, where the specification of member "Member9" is enumerated to comprise two dataflow paths, specifically {Cloud9, DWC9, B9A} and {Cloud9, DWC9, B9B}. In this configuration separate protocol handlers, and possibly separate networking infrastructure is used when accessing content stored in blob storage B9A as compared with accessing content stored in blob storage B9B.

Once each member has been initially instantiated, and once each protocol handler that is situated between a given pair of member has been configured at both ends, the members are signaled (step 120) to begin handling communication with its paired member(s). The foregoing discussion of FIG. 1D pertains to merely one possible embodiment and/or way to set up a data warehouse. Many variations are possible; for example, the data warehouse setup flow as comprehended in the foregoing can be implemented for achieving some particular performance requirement when sharing content objects and/or even when the members themselves are each in different cloud environments. One example of this is shown and described as pertains to FIG. 1E.

FIG. 1E depicts inter-cloud communications as used for high-performance object sharing between a plurality of vendor-specific IaaS entities. As an option, one or more variations of inter-cloud communications 1E00 or any aspect thereof may be implemented in the context of the architecture and functionality of the embodiments described herein and/or in any environment.

The figure is being presented to illustrate that multiple inter-cloud sharing protocols can be configured to implement high-performance object sharing between a plurality of vendor-specific IaaS entities. In this particular illustrative example, there are three hosts. Some computing resources of each of the IaaS entities serves as a member (e.g., the shown member1, member2, . . . , memberN) and hosts a respective controller (e.g., controller C1, controller C2, . . . , controller CN). As shown, each member includes a cache (e.g., cache, cache2, . . . , cacheN) that is situated between the member's controller and the member's storage facility (e.g., storage S1, storage S2, . . . , storage SN).

As such, data residing on a first cloud can be accessed by controller C2 of a second cloud (e.g., using the inter-cloud content sharing protocol $\mathbf{136}_{1\_2}$), and data residing a further cloud can be accessed by controller C2 of the second cloud (e.g., using the inter-cloud content sharing protocol $\mathbf{136}_{2\_N}$). Similarly, data residing on a still further cloud can be accessed by controller CN (e.g., using the inter-cloud content sharing protocol $\mathbf{136}_{N\_M}$). Access in the reverse direction is also supported. For example, data residing on a second cloud can be accessed by controller C1 of the first cloud.

As shown, each of the member's storage facilities (e.g., any number of instances or devices of nonvolatile physical storage 172) can be configured in accordance with respect to the hosting IaaS. In many cases, there are common parameters 126 that are shared between different IaaS vendors. Such common parameters include, but are not limited to (1) supported content types, (2) supported content operations, (3) performance parameters, and so on. These common parameters might derive from characteristics and or rules pertaining to the specifics of the member's storage facilities. Alternatively, the common parameters and their respective values might arise based on configuration of the member into the IaaS.

Alternatively or additionally, a member's storage facilities might be subject to any number of cloud-vendor parameters 128. Moreover, a member's storage facilities might be subject to any number of host-specific parameters (e.g., host-specific parameters $\mathbf{130}_1$, host-specific parameters $\mathbf{130}_2$, . . . , host-specific parameters $\mathbf{130}_N$) that derive from characteristics and or rules pertaining to the specifics of the host's computing resources.

It should be noted that a single cloud vendor may offer many different host types having many different capabilities. For example, a particular cloud vendor might offer (1) a preconfigured computing machine (or portion thereof) with a first preconfigured virtualization system, and/or (2) a preconfigured computing machine (or portion thereof) with a second preconfigured virtualization system, and/or (3) a bare metal host onto which any virtualization system can be loaded. Additionally or alternatively, a particular member can be configured with any number of user-specified parameters 141. Strictly as examples, one or more user-specified parameters might define data handling policies 142, any one or more of which data handling policies might be governed by (1) any number of host-specific parameter, and/or (2) any number of user-specified parameters 141, and/or (3) any codification of data handling policies 142 and corresponding policy applicability 144.

Range of Storage Options

A particular member can be configured to handle any of a wide variety of content objects. As shown, the nonvolatile physical storage at each site is capable of storing any manner of content objects (e.g., content object $\mathbf{189}_1$, content object $\mathbf{189}_2$, . . . , content object $\mathbf{189}_N$). In some cases such content objects are blobs of data (e.g., blob1 $\mathbf{187}_1$, blob2 $\mathbf{187}_2$, . . . , blobN $\mathbf{187}_N$) that have respective blob metadata (e.g., blob1 metadata $\mathbf{185}_1$, blob2 metadata $\mathbf{185}_2$, . . . , blobN metadata $\mathbf{185}_N$).

As used herein, a "blob" of data is a collection of data, usually binary data (hence the term "blob" is an acronym for Binary Large OBject) that does not necessarily follow any specific format or structure. A blob is simply a sequence of bits (0s and 1s) that can represent any kind of information, such as text, images, audio, video, or anything else. A blob of data can be of any size, from a few bytes to several gigabytes or more. In the storage systems contemplated herein, a blob of data can be stored as content object in non-volatile physical storage. In some cases, different portions of a blob can be stored across multiple non-volatile physical storage facilities that make up a data warehouse. In exemplary embodiments, a blob of data as well as any constituent separately-stored portions in a data warehouse each have a unique identifier and some metadata. Blob metadata can include storage oriented metadata such as a creation date, a size, a modification date, etc. Additionally, blob metadata can comport with a blob schema having fields and field values that serve to identify locations of constituent portions of the blob. In some cases, a blob schema includes fields and field values that facilitate retrieval of the blob from the data warehouse.

Different blob storage systems might be hosted by different IaaS vendors. Strictly as examples, a first blob storage systems might support different types of blobs, such as block blobs, append blobs, and page blobs, whereas a second blob storage system might offer particularly high availability, performance, and security for unstructured data, and whereas a third blob storage system might offer low-cost archival storage service for long-term data retention, whereas a fourth block storage offering might offer multi-regional, and/or nearline, and/or coldline storage classes for blob data.

The foregoing written description pertains to merely one possible embodiment and/or way to implement inter-cloud communications between members that interoperate to implement a data warehouse for blobs and other content objects. Many variations are possible. For example, the inter-cloud communications as comprehended in the foregoing can be implemented in any environment. When multiple vendor-specific IaaS resources are used, the inter-cloud communications might need to operate on semantically-normalized parameters that comport with a common meaning. As such, some embodiments federate or otherwise semantically normalize inter-cloud parameters. One example of such is shown and described as pertains to FIG. 1F.

FIG. 1F depicts inter-cloud parameter federation as used for translating between a plurality of vendor-specific content object storage facilities. As an option, one or more variations of inter-cloud parameter federation 1F00 or any aspect thereof may be implemented in the context of the architecture and functionality of the embodiments described herein and/or in any environment.

The figure is being presented to illustrate how member-specific parameters that derive from multiple heterogeneous IaaS offerings can be federated such that multiple individual controllers are able to interoperate cooperatively using semantically normalized parameters.

Strictly as an implementation choice, a federator module 146 can be employed to take in any of multiple sets of member-specific parameters, and then produce semantically-normalized parameter definitions 148. For example, a first member-specific parameter for "capacity" (e.g., capacity of a spinning media storage device) might be codified in terms of a number of bytes (e.g., 100 GB), whereas a second member-specific parameter, also for "capacity" (e.g., capacity of an SSD storage device) might be codified in terms of a nominal capacity of available memory cells, possibly including a parameter pertaining to that device's endurance rating.

A federator might choose a more detailed semantic over a less detailed semantic, even though it might result in definition of phantom parameters. For example, if the capacity of an SSD device is expressed in terms of a nominal capacity of available memory cells, plus a parameter pertaining to that device's endurance rating, then the capacity of a spinning media device might be semantically normalized by including an endurance rating parameter for the spinning media device that is the same as the spinning media's capacity in bytes.

The semantically-normalized parameter definitions 148 are provided to any one or more controllers (e.g., cluster-specific data warehouse controllers, virtualized controllers, logical controllers, etc.) and those controllers can agree between themselves to communicate using such semantically-normalized parameter definitions.

Any manner of parameter may be processed by the federator module, and any manner of semantically-normalized parameter definitions can be stored in a data warehouse configuration. As shown, a data warehouse configuration repository 152 stores semantically-normalized parameter values 149 as well as data handling policies 142 as well as policy applicability definitions 144. These are merely examples; any manner of parameters corresponding to any semantic can be federated into a common semantic, which common semantic is then used by cooperating warehouse controllers 158 (e.g., controller C1 $\mathbf{150_1}$, controller C2 $\mathbf{150_2}$, . . . , controller CN $\mathbf{150_N}$).

The foregoing pertains to merely one possible embodiment and/or way to implement an inter-cloud parameter federation. Many variations are possible, and many use cases are supported. For example, all or portions of the disclosed inter-cloud parameter federation techniques as comprehended in the foregoing can be implemented before and/or during the carrying out of ongoing data warehouse operations.

FIG. 1G depicts an ongoing operation flow for maintaining a data warehouse in accordance with one or more storage policies. As an option, one or more variations of ongoing operation flow 1G00 or any aspect thereof may be implemented in the context of the architecture and functionality of the embodiments described herein and/or in any environment.

The figure is being presented to illustrate how a variety of policies can be applied to operations taken over data items of a data warehouse. More specifically, the figure is being presented to illustrate how object tiering, object deduplication, and other policy-driven data warehouse operations can be performed on a per data item basis.

As shown, a sequence of data warehouse ongoing operations 160 commences upon receipt of a data item 153. A data item can be a blob, or a data item can be a non-blob content object, or a data item can be a portion of a blob or a portion of a non-blob content object, or a data item can be metadata that is associated with a blob or a non-blob content object. As a first step in the shown sequence, various data item parameters that are associated with the data item are gathered (step 162). The data item parameters might be provided together with data item 153, or the item parameters might be gathered from any corpora. In some cases, data item parameters are stored as data item metadata, which in turn can be stored in any manner and in any location. Strictly as examples, data item metadata might be stored in a file system directory and/or data item metadata might be stored in a data warehouse configuration repository 152. In some cases, data item metadata might correspond specifically to a data item, whereas in other cases, data item metadata might refer to handling of the corresponding data item.

Some embodiments, such as the embodiment depicted in FIG. 1G, various types of storage metadata 110, possibly including data item metadata 104 and/or dedupe metadata 106 are stored in any location accessible to the federator module (e.g., in data warehouse configuration repository 152). Additionally or alternatively, various types of storage metadata 110, possibly including data item metadata 104 and/or dedupe metadata 106 can be stored in ephemeral storage (e.g., in cache memory). The representation and semantics pertaining to any storage metadata may correspond to the range of data warehouse operations that are enabled and/or the range of data handling policies that are applicable at any given moment in time.

Continuing to explain the shown sequence of data warehouse ongoing operations, policies, and in particular then-applicable policies, can be retrieved (step 164) from the data warehouse configuration repository. In some cases, the parameters retrieved in step 164 can be used to inform a query to the data warehouse configuration repository so as to retrieve as many policies as are necessary that pertain to the data item. For example, if a parameter retrieved for a particular data item is a parameter that indicates tiering is enabled for that particular data item, then all policies that at least potentially apply to tiering are gathered (at step 164).

Once the policies that at least potentially apply to the data item have been retrieved, then the sequence continues through several checks, the results of which checks inform whether or not a particular handling regime should be applied to the data item. In the example of FIG. 1G, merely two handling regimes are shown, however many data handling regimes are contemplated.

In a first check (decision 165) a check is made to determine if the given data item is subject to tiering. The decision might be directly based on intrinsic information given in an applicable policy, or the decision might be made using extrinsic information that is gathered from any available source. If the data item is subject to tiering, then the "Yes" branch of decision 165 is taken and tiering operations are performed (step 166). Otherwise, the "No" branch is taken and processing enters a next check. In this case, the next check (decision 167) determines if the data item is subject to deduplication. If so, the "Yes" branch of decision 167 is taken and deduplication operations are performed (step 169). Otherwise, the "No" branch of decision 167 is taken and, at step 170, the data item is handled in accordance with any remaining policies.

As can be understood by one of skill in the art, operations corresponding to tiering and/or operations corresponding to deduplication may take into account the particular capabilities of a member of the data warehouse. That is, it can happen that one member of a data warehouse is associated with an IaaS vendor that exhibits particularly desirable features for long-term storage, and in this case, a sought-after or optimized tier demotion operation (e.g., moving from a higher tier to a lower tier) might involve moving the data item to a storage facility of the aforementioned IaaS vendor that has particularly desirable features for long-term storage. In contrast, it can happen that a deduplication policy demands that any candidate deduplication chunk (e.g., any portion of a data item subjected to a deduplication policy) must be stored in "Tier1" storage (see FIG. 3A). In such a case, the deduplication operations (step 169) might assess that a particular IaaS vendor exhibits particularly desirable features for "Tier1" storage and, in this case, a tier promotion operation (e.g., moving from a lower tier to a higher tier) might involve moving the candidate deduplication chunk to a storage facility of the aforementioned IaaS vendor that has particularly desirable features for "Tier1" storage.

The foregoing written description pertains to merely one possible embodiment and/or way to carry out ongoing operations that implement inter-cloud shared content data management. Many variations are possible; for example, the ongoing operation flow as comprehended in the foregoing can be implemented in any environment, one example of which is shown and described as pertains to FIG. 1H.

FIG. 1H depicts a data warehouse maintenance protocol for maintaining a data warehouse in accordance with one or more storage deduplication policies. As an option, one or more variations of data warehouse maintenance protocol 1H00 or any aspect thereof may be implemented in the context of the architecture and functionality of the embodiments described herein and/or in any environment.

The figure is being presented to illustrate how a data warehouse maintenance protocol might be configured to operate in any of the herein-disclosed environments. The particular configuration of three clouds, each comprising a cloud-specific protocol agent (e.g., first protocol agent 1741, second protocol agent 1742, and a further Nth protocol agent 174N) is merely for illustrative purposes. Other topologies and configurations are possible.

As shown, the protocol commences upon an agent's recognition of a potential storage deduplication event 176. In this case the first protocol agent responds to the event by performing fingerprinting over some or all of the data units that comprise the data item corresponding to the event. The first protocol agent advises one or more neighboring clouds (e.g., via messaging to second protocol agent 1772) of the existence of the data unit and/or the existence of one or more fingerprints of the data unit. The one or more neighboring clouds then check its respective storage metadata (e.g., operation 1811) to determine if portions of the data item are already stored at the respective neighboring cloud (e.g., the second cloud, or in some cases a further neighboring cloud). If so, the second protocol agent responds to the first protocol agent with an indication that "Yes", indeed, that data unit exists at the second cloud (otherwise the "No" path 1773 is taken). The first protocol agent upon recognizing that the subject data unit is already stored at the second cloud does not store a duplicate of the data unit. Instead, the first protocol agent marks the location (i.e., in this case, the location at the second cloud) where the data unit can be found. This is done for all data units that have fingerprints until the last data unit has been considered. The first protocol agent checks if the last data unit of the data item has been processed, and if not, the "No" path 1771 is taken.

Now, returning to processing by the second cloud, and specifically processing by the second protocol agent upon a determination that the subject data unit is not present at the second cloud, then the second protocol agent will form a chained inquiry 178, which is forwarded on to a further Nth protocol agent (e.g., via message 179). The Nth protocol agent checks its storage metadata (e.g., operation 1812) and advises the originator of the inquiry (in this example, the first protocol agent) of the location in the Nth cloud where the data unit can be found. The originator marks the advised location in its own data item metadata. The protocol continues (e.g., path 1772) so long as there are further data units to consider.

The foregoing written description pertains to merely one possible embodiment and/or way to implement a data warehouse maintenance protocol. Many variations are possible, for example, the data warehouse maintenance protocol as comprehended in the foregoing can be implemented in any environment and/or in accordance with any data flow, one example of which is shown and described as pertains to FIG. 2.

FIG. 2 is a diagram showing a data flow 200 that implements policy-based data deduplication services across infrastructure-as-a-service entities. The figure is being presented to substantiate that, with the inexorable explosion of data, more and more techniques are needed to manage unnecessary duplication of data items.

Deficiencies of Legacy Fingerprinting Deduplication Techniques

In some deduplication regimes, when responding to a request for storing data, a file system or agent checks to see if the identical data item (e.g., the identical file or the identical portion of a particular file, or identical bits in a block or data extent of a particular file) already exists in the file system or other managed storage repository. If so, deduplication logic will prevent the data item from being stored again, and the request for storing data is satisfied by referencing the occurrence of the already-stored data item-without duplicating storage of the identical data by storing it again. Checksums or other fingerprints are used to determine uniqueness of the data item, which uniqueness characteristic is in turn used to determine whether or not the identical data item already exists in storage.

In modern computing environments, a single data repository at a central site can be accessed by multiple independently-operated sites (e.g., satellite sites). Each independently operated site might have one or more individual data owners, which in turn might have individual data storage relationships with respect to the central site. Such relationships include contracts, subscriptions, commitments, and related policies such as backup frequency policies, restore point commitments, and other service level agreement provisions. For example, a first data owner might have a policy to store its data in a "higher tier" or "highest tier" of the data repository while a second data owner might have a policy to store its data in a "lower tier" or "lowest tier" of the data repository.

Unfortunately, deduplication logic (e.g., for making decisions to replicate a block of data or not to replicate a block of data to a storage repository) is often based merely on a fingerprint or other characteristic of uniqueness of the data in the block. This coarse logic is deficient. Specifically, techniques that decide not to replicate a block of data merely based on a fingerprint or other characteristic of uniqueness are deficient, at least in that they fail to consider other characteristics that might apply to the particular requestor/owner, or to the particular block or portion of the file, etc.

What is needed are techniques for deduplication that improve over the aforementioned deficiencies. Accordingly, disclosed herein are techniques that are used to decide to replicate or not to replicate a particular data item based on that data item owner's policies or that data item owner's rules or requirements. In some cases, a decision to replicate or not to replicate a particular data item might be based on a then-current status of the data item and/or the manner in which the data item had been stored as a result of operation of a previous storage request. For example, a first data owner might require that a data item comprising "file F" (e.g., a copy of "Spiderman") is to be stored in a top tier of a multi-tier storage facility, whereas a different, second data owner might specify that its data item comprising "file F" (e.g., another identical copy of "Spiderman") is to be stored in a lowest tier of the same multi-tier storage facility. Data can be deduplicated by not storing a physical second copy of "Spiderman" in the lowest tier and, instead, merely indicating that the physical second copy of "Spiderman" that would have been stored in the lowest tier can be accessed from the copy in the top tier. If the top tier data item that is owned by the first data owner is ever deleted, then the copy that is stored in the lower tier is marked as owned by the second data owner.

In accordance with embodiments as disclosed herein, determination and operation of relationship-based storage instructions (e.g., to duplicate or not, and/or how and/or where to duplicate or not) serve to reduce computing resources required to serve multiple sites that have varying policies. Some embodiments issue relationship-based storage instructions to two or more data storage repositories. As the number of satellite sites and corresponding relationships to the data storage repositories increases, so increases the efficiency of the herein-disclosed deduplication system as a whole.

Various relationship-based deduplication action determination logic is disclosed hereunder. In some embodiments, action determination is based on one or more system aspects such as those depicted in Table 1. Specifically, the relationship-based deduplication action determination logic might process a storage request based on a topology where each site is a node of a topology graph and where relationships between nodes of the topology graph, and/or policies that are associated with any of the pairs of nodes and/or any rules that implement a policy or portion thereof, are represented in the topology graph as edges.

TABLE 1

| System Aspect | Usage |
|---|---|
| Topology | Determines the presence of a relationship between one computing site (e.g., laaS site) relative to another computing site |
| Relationship | Specifies an aspect or name between two sites |
| Policy | Name that describes a particular set of rules |
| Rule | Specifies how a particular data item is to be handled |

Continuing with the discussion of FIG. 2, the embodiment shown in FIG. 2 is merely one example. As shown, data flow 200 is composed of setup operations 202 and ongoing deduplication operations 204. The setup operations 202 include mechanisms to identify a computing environment that comprises a plurality of data producer-consumers that communicate data items with one or more shared data storage sites (step 210). Such identification can arise from a given topology map or other such data structure, and/or from registration operations carried out between nodes in the computing environment, and/or using any known technique. At step 205, any or all of the plurality of data producer-consumers can be populated into a column of a data structure such as the leftmost column of the shown relationship data structure 2111.

In another column of the relationship data structure 2111, some or all of the data producer-consumers may have a corresponding policy or set of policies. A policy or set of policies can be codified such as by referring to a policy by name (e.g., policy "P1", policy "P2", . . . , policy "PN"), and/or by associating a policy name to a set of constituent rules (e.g., rule R1, rule R2, etc.). Irrespective of the mechanisms and/or techniques to populate the relationship data structure, ongoing data deduplication operations can derive policy metadata 222 directly or indirectly from the relationship data structure 2111.

As depicted and discussed in FIG. 1B, any number of data producer-consumers (e.g., VMs) can operate independently. As an example, a particular data producer-consumer might perform various backup operations (e.g., transmitting disaster recovery data to a disaster recovery data storage site), and any such transmission might include a data item 153 that raises a potential storage deduplication event 176, which deduplication event is associated with a candidate deduplication chunk 209 (e.g., a fingerprinted data unit or data unit range of a data item).

Upon occurrence of a potential storage deduplication event 176, a flow comprising a set of deduplication operations is invoked. At step 220, the event is associated, directly or indirectly, with the originator of a block of data or range of data such that the block or range can be associated to an originating site or owner that is in turn associated with any of the one or more policies that were established in the setup operation 202. As an example, if a particular potential storage deduplication event is raised by a process of site "S1", then by performing a lookup operation over the relationship data structure, the pre-established association of "S1" to policy "P1" can be retrieved. The constituent rules of the associated policy (e.g., rule R1, rule R2) can be retrieved in the same access. In some cases, the associations can be stored in a queryable relationship data structure 2111. As such, associations can be codified as a response to a query. In other cases, the entire relationship data structure is retrieved and policy metadata can be codified using any known technique that produces information about policies (e.g., policy metadata 222). In some cases policy metadata facilitates correlations between sites and policies, and/or processes and policies, and/or policies and rules, etc.

At step 230, aspects of the potential storage deduplication event are considered to determine whether or not a policy is applicable and, if so, which policy or policies are at least potentially applicable to the event. In many cases, when the potential storage deduplication event is deemed to indeed be subject to consideration with respect to a policy or policies, then metadata for the data that is the subject of the event is retrieved. As one example, any of the data item(s) (e.g., block or range of blocks) that pertain to the event can have associated data item metadata that is delivered with the event. In some cases, metadata can be generated and/or retrieved based on aspects of the event. For example, if an event pertains to block "X", the fingerprint or checksum of block "X" can be calculated and the fingerprint or checksum can be included together with or as a part of data item metadata 104 (see FIG. 1G).

Given the data item metadata, at step 240 the status of the underlying data item can be determined. For example, the aforementioned fingerprint or checksum can be compared against fingerprints or checksums that are stored in a table or in metadata, or in a directory or in a database. Performance of step 240 results in a data structure that characterizes the then-current state of the data item (data item status 233), which is used in subsequent processing. As shown, step 250 is performed concurrent with step 240. In step 250, policy metadata 222 is analyzed to determine a set of rules that are at least potentially applicable to the previously-retrieved policies.

The data item status 233 and the set of at least potentially applicable rules 244 are made available to subsequent processing. In the shown example, step 260 analyzes the set of potentially applicable rules 244 with respect to the status of the data item. In some cases, a rule is immediately applicable to a data item having a particular status. For example, if a rule states, "always store 'hot' data items in 'Tier1'", and the data item status includes a "hot" indication, then that data item should be stored in "Tier1". In other cases, it can happen that a rule is not definitively known to be applicable or not until all of the at least potentially applicable sets of rules have been considered.

Continuing with the discussion of FIG. 2, when the rules have been analyzed with respect to the status of the data item, then step 270 is entered. The applicable actions 245 are transformed into instructions that serve to implement the policies that pertain to the data item. For example, if policy "P1" includes rule "R1" to "always store 'hot' data items in 'Tier1'", and if the subject data of item "X" was deemed to be 'hot', then instructions having the semantics of "store data item 'X' in 'Tier1'" is emitted.

The foregoing discussion of FIG. 2 includes discussion of sites, policies and rules. The relationships between sites and policies, and the relationships between policies and rules, as well as example techniques for how to make and use such associations, are shown and discussed as pertains to FIG. 3A.

Figure 3A:
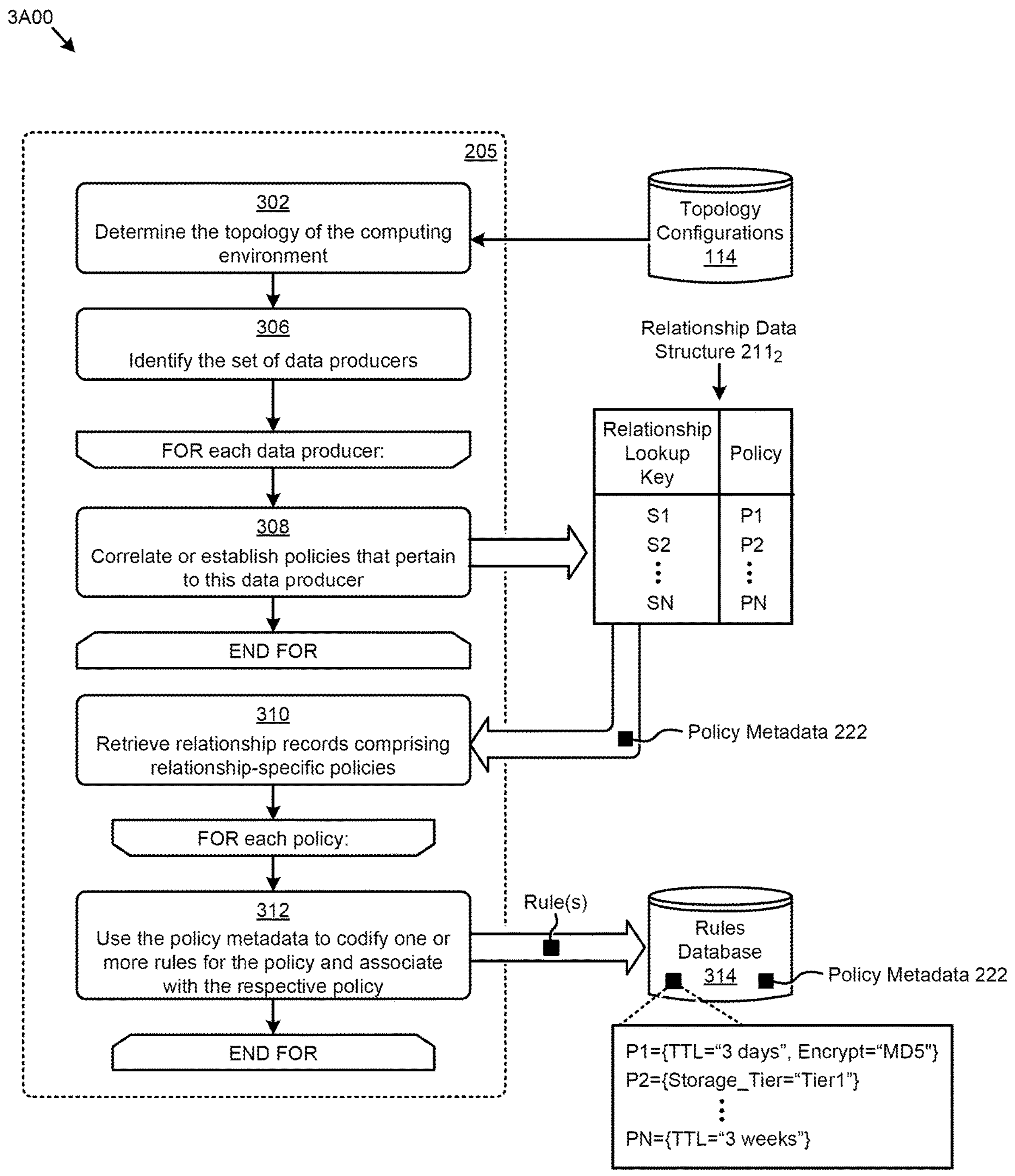
FIG. 3A is a data flow diagram depicting use of policy metadata and a rules database in a system for policy-based data deduplication, according to an embodiment.

FIG. 3A is a data flow diagram 3A00 depicting use of policy metadata and a rules database in a system for policy-based data deduplication. As an option, one or more variations of data flow diagram 3A00 or any aspect thereof may be implemented in the context of the architecture and functionality of the embodiments described herein. The data flow diagram 3A00 or any aspect thereof may be implemented in any environment.

The data flow diagram 3A00 includes steps for performance of the shown step 205. Step 205 (e.g., as introduced in FIG. 2) serves to establish relationships between data producer-consumers and policies and/or rules. As depicted in FIG. 3A, it does this by carrying out a sequence of steps. Specifically, and as shown, the topology of a multi-site system is determined (step 302). This can be accomplished by analyzing a set of given topology configurations 114, or by using any known technique. In some cases, a topology is given as a graph with nodes and edges. In other cases, topological relationships between data producer-consumers and a corresponding one or more data storage sites are given in a table.

At step 306, the topological semantics of the foregoing topological determinations are used to identify the set of data producers of the multi-site system. Next, for each identified data producer, step 308 serves to correlate or establish policies that pertain to a particular one of the data producers. In some cases, a set of policies are known to be correlated to a particular data producer is based on the existence of an SLA. In other cases, an administrator completes a form that assigns named policies to a data producer. Irrespective of the particular technique to process policies that pertain to a particular one of the data producers, a data structure such as the shown relationship data structure 2112 is populated. When all of the data producers have been considered, then processing moves to steps that further populate the relationship data structure 2112 with rules for each policy.

Specifically, and as shown, step 310 serves to retrieve all or part of relationship data structure 2112, or step 310 serves to retrieve policy metadata 222 that is derived from relationship data structure 2112. For each named policy, and based on the union of the named policies that are so retrieved, any associations between a named policy and a set of constituent rules are determined. For example, if a named policy is "Platinum-level SLA" and the terms of the "Platinum-level SLA" include a provision to "restore within 12 hours," then an association between "Platinum-level SLA" and a rule such as "never store in a remote data storage facility" are established.

Codification of such rules and techniques for forming associations between policies and codified rules can use any known techniques. Strictly as examples, the semantics of a rule can be codified in a markup language such as the extensible markup language (XML). Or, in some cases, a rule is coded as a predicate test such as an IF clause, and the THEN clause can be coded as an action to be taken when the predicate evaluates to TRUE. Step 312 is performed for each named policy. The result of performance of step 312 includes formation of a rules database 314. The rules database might include policy metadata 222 that holds a specific association between a named policy such as "P1" and any one or more rules. In the example shown, policy "P1"

includes a rule of "time to live (TTL) after deletion is 3 days" as well as another rule that specifies to "use MD5 for encryption."

The embodiment shown in FIG. 3A is merely one example flow of setup operations that result in correlations of particular producers to policies. Correlations to policies might be formed based on particular data types (e.g., a .DOCX document, or a .MOV document, etc.) and respective data-specific policies. Or, in some embodiments, correlations to policies might be formed based on characteristics of an entity (e.g., an agency, a clearinghouse, etc.) and respective entity-based policies. Additionally or alternatively, correlations to policies might be formed based on characteristics of an individual and/or his or her roles (e.g., a manager role, an employee role, etc.) and respective role-based policies. Still further, correlations to policies might be formed based on characteristics of a spending objective or based on a performance objective.

When all or portions of the setup operations have been initiated and/or completed so as to correlate a source to one or more policies, and/or when all or portions of the setup operations have been initiated and/or completed so as to populate a database of rules and policy metadata, then incoming events raised by the sources can be analyzed with respect to such rules and policy metadata. One technique for event analysis is given in the following FIG. 3B.

Figure 3B:
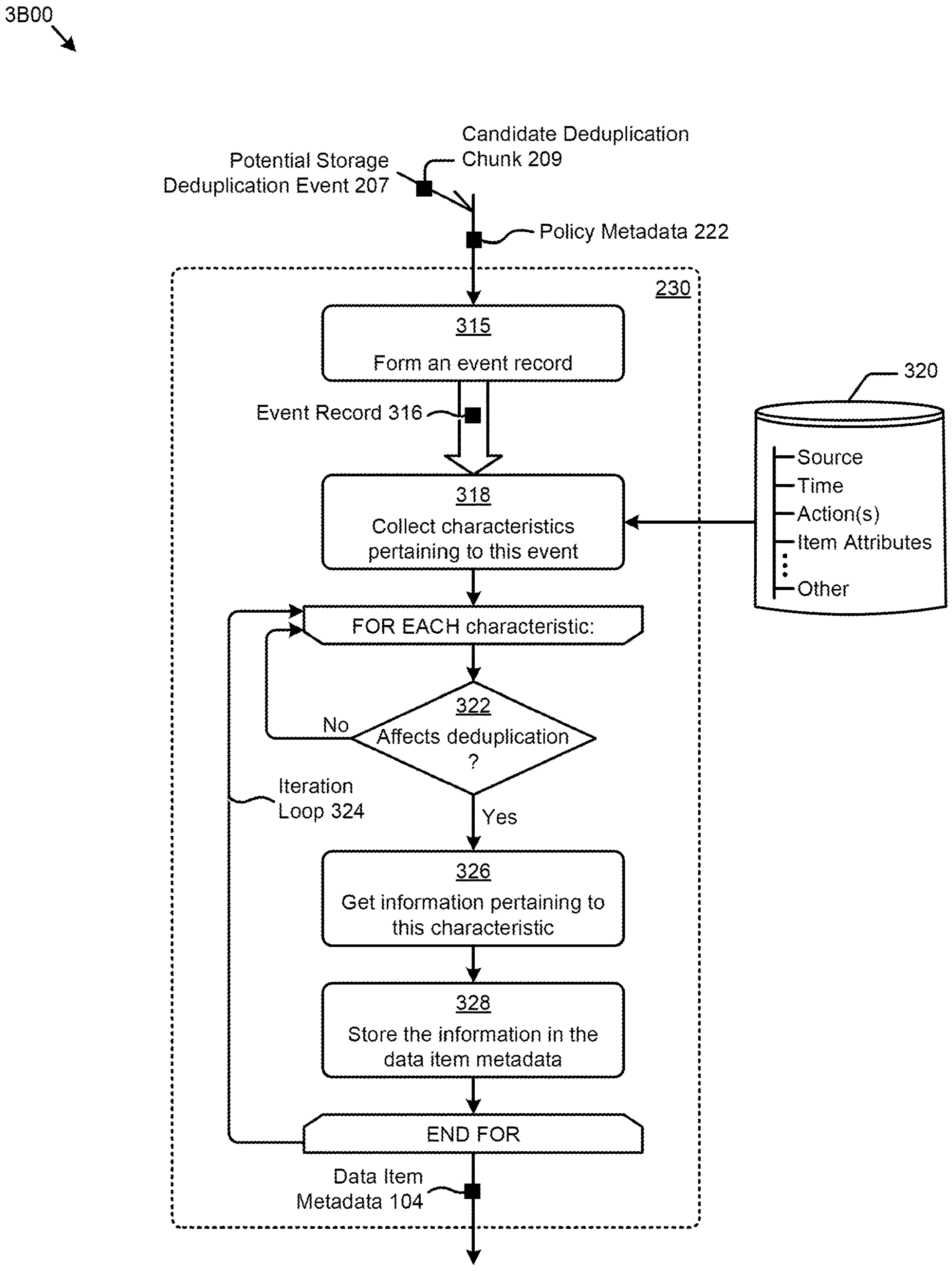
FIG. 3B is a data flow diagram showing an event analysis flow as used in systems that perform policy-based data deduplication, according to an embodiment.

FIG. 3B is a data flow diagram showing an event analysis flow 3B00 as used in systems that perform policy-based data deduplication. As an option, one or more variations of event analysis flow 3B00 or any aspect thereof may be implemented in the context of the architecture and functionality of the embodiments described herein. The event analysis flow 3B00 or any aspect thereof may be implemented in any environment.

The event analysis flow 3B00 includes steps for performance of step 230 (see FIG. 2) and results in generation of metadata that characterizes the event type as well as any other information that would be at least potentially used for making deduplication decisions. In previous processing (e.g., in step 220) a potential storage deduplication event 176 and a corresponding data item are used to retrieve applicable policy metadata 222. Such policy metadata might or might not be sufficient to make downstream deduplication decisions. As such, the shown event analysis flow 3B00 serves to collect additional information. In this embodiment, step 315 forms an event record 316 based at least in part on an occurrence of a potential storage deduplication event 176. In some cases a potential storage deduplication event might be a storage I/O (input/output or IO) command (e.g., WRITE I/O command) that corresponds to a candidate deduplication chunk 209. The storage I/O command might be given in a particular format, which might not, by itself, include enough information to make downstream deduplication decisions (e.g., to determine next actions to take over the candidate deduplication chunk). Therefore, step 318 through step 328, including decision 322 and the iteration loop 324 are performed so as to collect and codify data item metadata 104, which in turn is used in making downstream deduplication decisions.

Specifically, at step 318 a dataset 320 is accessed to determine a set of characteristics that at least potentially apply to making downstream deduplication decisions based on characteristics of the potential storage deduplication event 176 and/or based on characteristics of the candidate deduplication chunk 209. Strictly as examples, such characteristics might include the source of the event, the time of the event, the action or actions that explicitly or implicitly pertain to the event, and/or a set of attributes that pertain to the data item to be considered for deduplication. For each such retrieved characteristic, decision 322 is taken to determine if the characteristic and/or its value is at least potentially applicable to making downstream deduplication decisions. If not, the "No" branch of decision 322 is taken. Otherwise, the "Yes" branch of decision 322 is taken and step 326 is entered to collect information pertaining to the characteristics of the then-current iteration. Strictly as an example, information that might pertain to a source characteristic might be the site name or requestor's name. As another example, information that might pertain to a time characteristic might be codified as a timestamp or sequence control number of the particular event being considered. Still further, information that might pertain to the data item itself might include a fingerprint, encryption-related information, etc. At step 328, while information such as the foregoing is collected, the information is codified and stored as data item metadata. The iteration loop proceeds over all of the characteristics that were collected in step 318. When the iteration loop exits, data item metadata 104 is ready to be presented to or for downstream processing.

Returning again to the discussion of the potential storage deduplication event 176 and collection of characteristics of the event, the incoming event might be raised by a data producer that seeks to push a data item to the storage site (e.g., for disaster recovery purposes), or the incoming event might be raised by an agent in the storage site that seeks to purge a data item based on expiration of a data retention policy. Each of these two cases can be determined by analyzing the event and/or any data pertaining to the event. More specifically, information pertaining to the event might be received in or with the event indication. For example, an event might be raised after a data producer-consumer sends backup data to the data storage site. Such backup data might be sent along with, or as a part of, a message that is transmitted over a network. As another example, an event might be raised after an agent at the data storage site invokes a subroutine at the data storage site. Such a subroutine might include an explicit indication of the type of event (e.g., a data retention purge event indication value). Or information pertaining to the event might be implied based at least in part on the name or occurrence of the invoked subroutine. In some embodiments, certain portions of metadata for the particular data item might be included in or with a message that raises the event. In other cases, the metadata or portions thereof for the particular data item is retrieved from any available repository, possibly from a cache.

Upon completion of the iteration loop, processing is passed to downstream processing. Specifically, and as shown in FIG. 2, after completion of step 230, step 240 retrieves or calculates a status indication for the data item. Such a status indication, in combination with a set of rules pertaining to the data item and/or its status, is used to determine applicable actions 245 to take.

Further details regarding general approaches to managing data deduplication are described in U.S. Pat. No. 10,922,280 titled "POLICY-BASED DATA DEDUPLICATION" issued on Feb. 16, 2021, which is hereby incorporated by reference in its entirety.

Unfortunately, managing deduplicated data in a highly dynamic computing and storage system can present still further challenges that are not specifically addressed by the foregoing rule-based, status-based, and policy-based techniques. Specifically, certain legacy techniques might maintain a data item's status using a cardinal number as a reference count corresponding to the number of references (e.g., by the producer-consumers, users, administrators, agents, etc.) to each unit (e.g., block, file, area, extent, region, etc.) of deduplicated data. In such legacy systems, for each new reference to the deduplicated data, a reference count will be accessed to record a new (e.g., incremented) value of the reference count. When a certain resource relinquishes its reference to the deduplicated data (e.g., overwrites the data with modified data), the reference count will be accessed again to record a new (e.g., decremented) value of the reference count. An accurate reference count can then be used to determine a time for removal (e.g., "garbage collection") of deduplicated data (e.g., when the reference count is zero).

However, in highly dynamic large scale distributed systems having numerous potential references to any given deduplicated data, continually updating the metadata to maintain accurate reference counts can consume a costly amount of computing and/or networking resources, and in some cases maintaining accurate reference counts in the presence of numerous users can become a computing bottleneck. In modern distributed computing environments, maintaining reference counts for deduplicated data often carries the additional risk of a bottleneck due to the fact that many nodes might have access to the reference counts, and as such, some technique needs to be in place to avoid corruption of the reference count data. To accurately maintain the reference counts, even when many nodes have READ/WRITE access to the reference counts, legacy systems have implemented semaphores and/or atomic operations (e.g., compare-and-swap or content-addressed storage (CAS) operations) so as to handle concurrent access to each distributed reference count instance. In such cases, users might experience delays resulting from collisions (e.g., CAS failures) when attempting to update a reference count. Such delays might result in a negative user experience.

What is needed is a technological solution for efficiently tracking deduplicated data access without reliance on traditional methods used for implementing semaphores and/or atomic operations. More specifically, what is needed are techniques for implementing collision free access to a deduplication metadata entry (e.g., including Boolean usage flags) that are used to facilitate efficient ongoing management of deduplicated data units.

As used herein, a data unit is a range of storable data such as a disk block or a series of blocks, or a slice or slices, or an extent, region, or other series of storage areas of data that can be subjected to calculation of a checksum value. In certain embodiments, the Boolean deletion flag and/or the Boolean usage flag can store a Boolean value (e.g., "true" or "false", "1" or "0", etc.) representing one of two possible states. When a data unit is first stored, a Boolean deletion flag for that data unit is created and set to a "do-not-delete" state (e.g., "false" or "0"). Additional accesses to the same data unit are stored as a reference (e.g., map entry) to the location of the same data, thus serving to deduplicate the data.

Periodically, a scan is performed to determine if there are any references to a particular deduplicated data unit. If there are references detected, the Boolean usage flag is set to an "in-use state" (e.g., "true" or "1"). Based on the results of the scan, if there are no references detected for a given data unit, the Boolean usage flag pertaining to a respective data unit is set to a "not-in-use state" (e.g., "false" or "0"). If the scan indicates that there are no references and the Boolean deletion flag is in a "do-not-delete" state, the Boolean deletion flag is updated to indicate a "delete" state (e.g., "true" or "1"). If, on a given data unit scan pass, there are no references and the Boolean deletion flag is in a "delete" state, the data unit is deleted from storage. In certain embodiments, any of the Boolean variables are stored in metadata. Metadata refers to any storage location (e.g., persistent or non-persistent) that comprises information pertaining to respective data (e.g., pertaining to a data unit). In certain embodiments, the herein disclosed techniques can be implemented without reliance on semaphores, atomic operations, and/or a reference count value. In certain embodiments, the number of referrers detected for the data units can be quantified for statistical analysis of the deduplication operations. In certain embodiments, the data units are analyzed (e.g., scanned) according to a garbage collection schedule.

As such, the ingested data units are periodically scanned to identify a usage state and the deletion state of each data unit to determine various deduped data management operations that can then be executed. For example, the foregoing scan might be performed every three hours as a deduped data garbage collection process. In this case, the deduped data management operations might comprise instructions to delete certain data units that have a usage state that indicates they are not in use and/or have a deletion state that indicates they are marked for deletion.

In certain embodiments, the earlier described deduped data management actions (e.g., operations) are determined from certain combinations of the delete state and the usage state. One example of a data structure and rule base for determining the deduped data management actions is shown and described as pertaining to FIG. 3C.

Figure 3C:
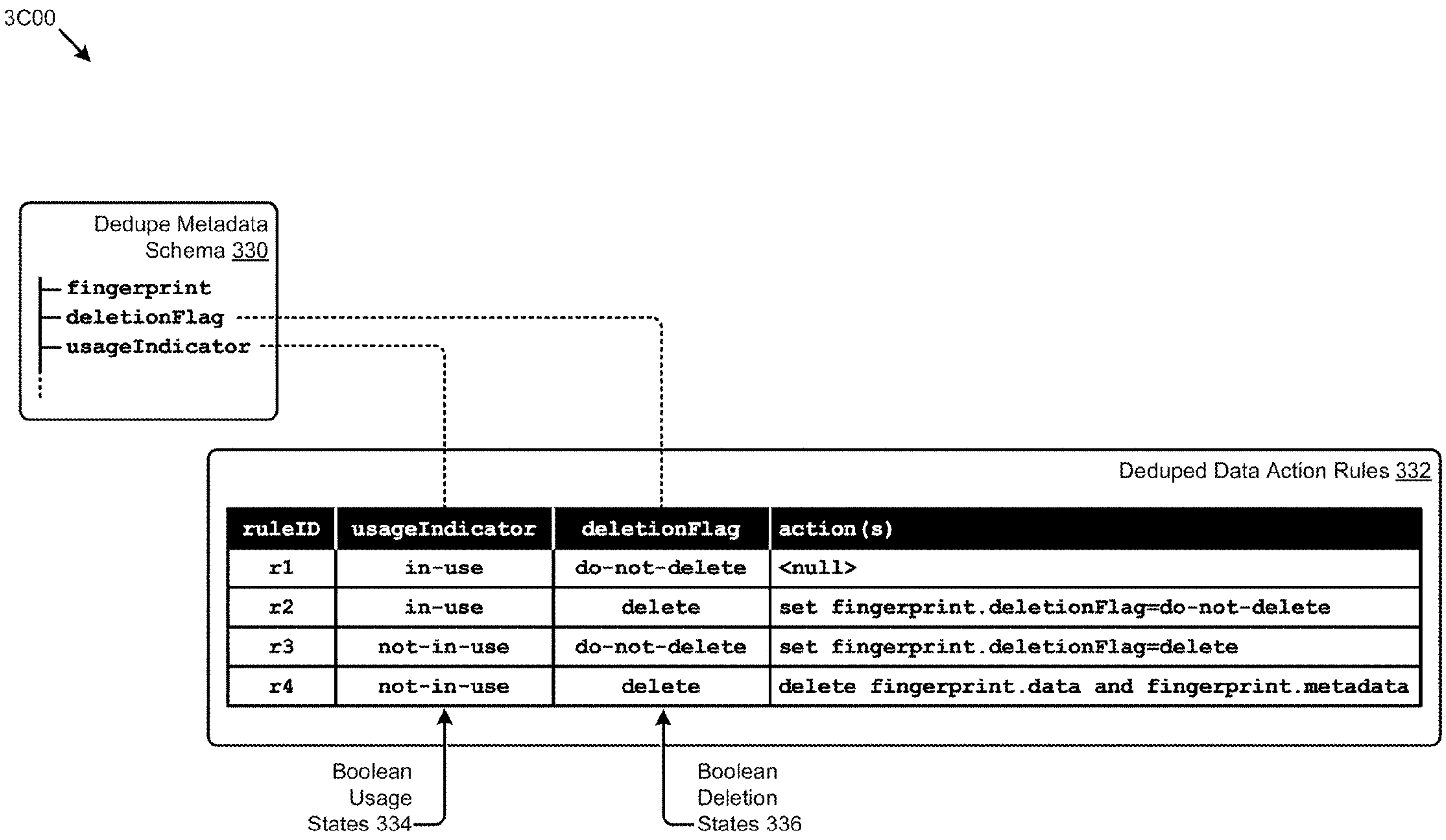
FIG. 3C illustrates specialized data structures as used to implement data deduplication services across disparate infrastructure-as-a-service entities, according to an embodiment.

FIG. 3C illustrates specialized data structures 3C00 designed to improve the way a computer stores, retrieves, and processes data in memory when performing steps pertaining to efficiently managing deduplicated data in large scale distributed computing environments. As an option, one or more variations of specialized data structures 3C00 or any aspect thereof may be implemented in the context of the architecture and functionality of the embodiments described herein. The specialized data structures 3C00 or any aspect thereof may be implemented in any environment.

In certain embodiments, the data comprising the earlier described dedupe metadata implemented according to the herein disclosed techniques are often organized and/or stored in a tabular structure (e.g., relational database table). Such tabular structures might have rows corresponding to a particular data unit and columns corresponding to various attributes pertaining to that data unit. For example, as depicted in the dedupe metadata schema 330, a table row might describe a "fingerprint" of a given data unit, a Boolean deletion flag or "deletionFlag" of the data unit, a Boolean usage flag or "usageIndicator" of the data unit, and/or other attributes of the data unit. In certain embodiments, the Boolean usage flag might be stored in a persistent storage facility, such as dedupe metadata, and/or stored in an ephemeral storage facility, such as a programming object.

In some cases, the Boolean deletion flag and/or the Boolean usage flag of a given data unit can store in the dedupe metadata a Boolean value representing one of two possible states. As shown, a set of Boolean usage states 334 might comprise an "in-use" state and a "not-in-use" state. Further, a set of Boolean deletion states 336 might comprise a "do-not-delete" state and a "delete" state. These states can be exposed to a set of deduped data action rules 332 to determine one or more dedupe data management actions or operations. A set of rules (e.g., rule base) such as deduped data action rules 332 comprises data records storing various information that can be used to form one or more constraints to enforce over certain functions and/or operations. For example, the information pertaining to a rule in the rule base might comprise the conditional logic operands (e.g., input variables, constraints, etc.) and/or operators (e.g., "if", "then", "and", "or", "greater than", "less than", etc.) for forming a conditional logic statement that returns one or more results.

As can be observed, deduped data action rules 332 can be organized and/or stored in a tabular structure (e.g., relational database table) having rows corresponding to a rule and columns corresponding to various attributes pertaining to that rule. Specifically, as depicted in FIG. 3C, a table row might describe a rule identifier or "ruleID", a state of the "usageIndicator" for that rule, a state of the "deletionFlag" for that rule, the resulting "action(s)" associated with the logical combination of the foregoing states, and/or other attributes. As an example, a rule "r1" specifies no action (e.g., "<null>" result) when a certain data unit has a then-current "in-use" usage state and a then-current "do-not-delete" deletion state. As another example, a rule "r3" specifies an action to set the "deletionFlag" of a data unit with a certain "fingerprint" to a "delete" state when that data unit has a then-current "not-in-use" usage state and a then-current "do-not-delete" deletion state. Other actions corresponding to the other combinations of usage states and deletions states are possible (e.g., see rule "r2" and rule "r4" in deduped data action rules 332).

Further details associated with tracking deduped data status using the aforementioned dedupe metadata is shown and described as pertaining to FIG. 3D.

FIG. 3D presents a deduplicated data status tracking technique 3D00 as implemented in systems for efficiently managing deduplicated data in large scale distributed computing environments. As an option, one or more variations of a deduplicated data status tracking technique 3D00 or any aspect thereof may be implemented in the context of the architecture and functionality of the embodiments described herein. The deduplicated data status tracking technique 3D00 or any aspect thereof may be implemented in any environment.

The deduplicated data status tracking technique 3D00 presents one embodiment of certain steps and/or operations that facilitate efficient tracking of deduplicated data in large scale distributed computing environments. The deduplicated data status tracking technique 3D00 can commence by detecting a data unit ingest operation invoked from a computing resource (step 338). For example, the data unit might be one of many data units (e.g., data blocks) comprising a file written by a virtual machine. A fingerprint (e.g., hash) of the data unit is generated (step 340). As an example, data units of size 16K might be fingerprinted during ingest using a secure hash algorithm (e.g., secure hash algorithm SHA-256). Other data unit sizes and/or fingerprinting sizes are possible.

If the data unit fingerprint does not exist in any of the storage metadata (see "No" path of decision 342), then the data unit is stored in physical storage (step 348). A map entry in the data item metadata of the computing resource that invoked the data unit ingest operation is also generated to map the data unit fingerprint to the physical storage location (step 3501). A Boolean deletion flag associated with the data unit fingerprint is created (step 352) and set to a "do-not-delete" state (step 354). If the data unit fingerprint exists in storage metadata (see "Yes" path of decision 342), then the data item metadata of the computing resource is checked for a map entry for the data unit fingerprint (decision 344).

In some cases, the data unit fingerprint exists in the data item metadata of other computing resources (e.g., due to earlier ingest operations of the data unit) but not in the data item metadata of the computing resource that invoked the data unit ingest operation. In these cases (see "No" path of decision 344), the data unit is deduplicated by generating a map entry in the data item metadata of the computing resource to map the data unit fingerprint to the earlier existing physical storage location of the data unit (step 3502). When a map entry exists in the data item metadata of the computing resource (see "Yes" path of decision 342), the Boolean deletion flag associated with the data unit fingerprint is checked to determine its state (decision 356). If the Boolean deletion flag is set to the "delete" state (see "Yes" path of decision 356), the flag is set to the "do-not-delete" state. If the Boolean deletion flag is not set to the "delete" state (e.g., it is set to the "do-not-delete" state) then the flow proceeds by taking the "No" path of decision 356.

As shown, data status tracking technique 3D00 is implemented in a continuous loop of steps and/or operations. This is because it is possible that there is an ongoing data unit ingest operation being carried out during processing of steps and/or operations of the loop of status tracking technique 3D00. Strictly as implementation choices, one way to address the ongoing nature of data ingest operations is to have an event listener; another way is to have a continuous loop (as shown). A scenario illustrating details of such a data status tracking technique is shown and described as pertains to FIG. 4A through FIG. 4J.

FIG. 4A through FIG. 4J illustrate a deduplicated data tracking scenario 400 as facilitated by the herein disclosed techniques for efficiently managing deduplicated data in large scale distributed computing environments. As an option, one or more variations of deduplicated data tracking scenario 400 or any aspect thereof may be implemented in the context of the architecture and functionality of the embodiments described herein. The deduplicated data tracking scenario or any aspect thereof may be implemented in any environment.

The deduplicated data tracking scenario 400 illustrated in FIG. 4A through FIG. 4J depicts certain operations and/or interactions between components comprising the computing environment earlier shown and described as pertaining to FIG. 1A1 through FIG. 1B. The shown operations and/or interactions in deduplicated data tracking scenario 400 illustrate merely one example of efficient management (e.g., tracking) of deduplicated data as facilitated by the herein disclosed techniques.

Figure 4A:
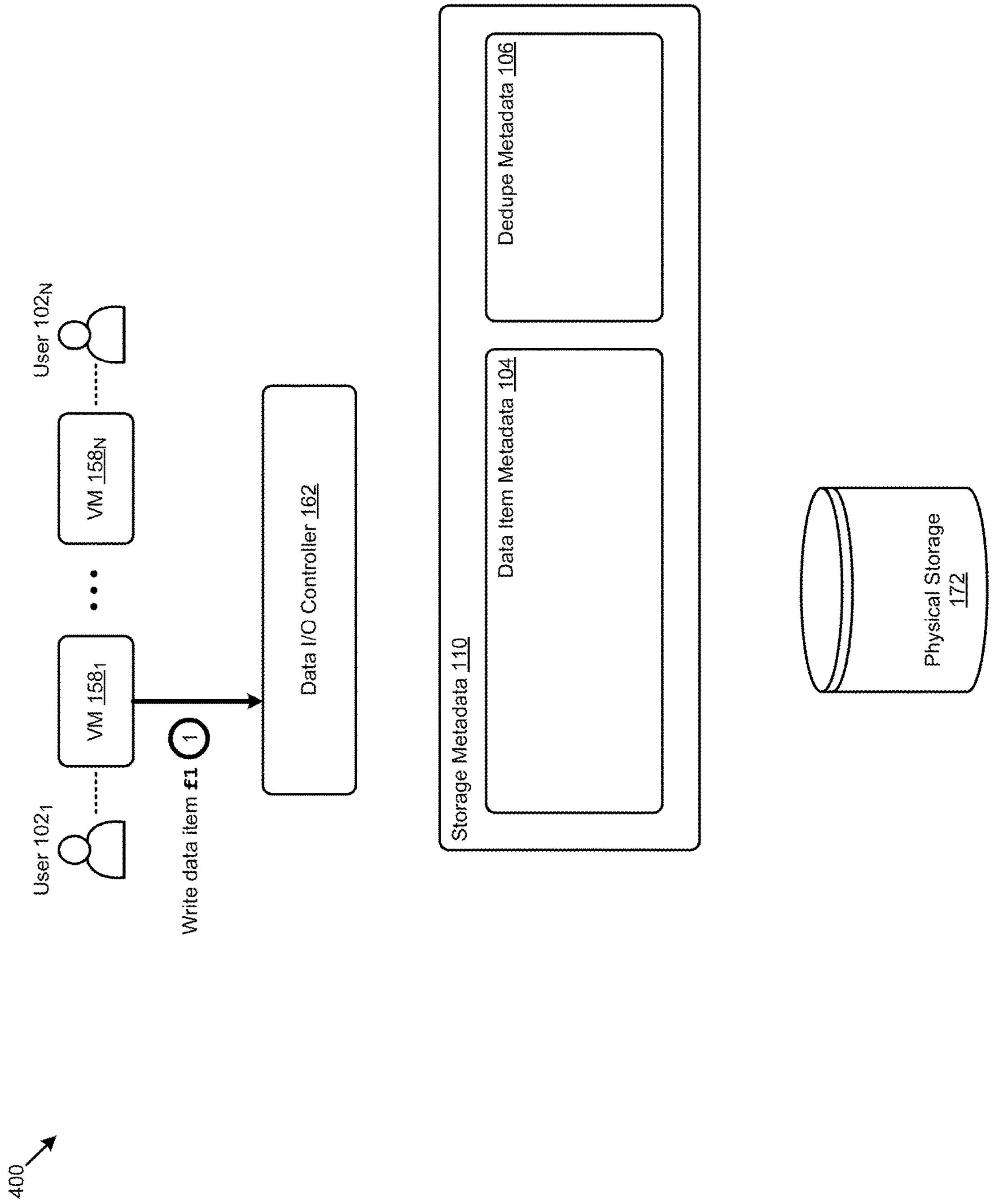
FIG. 4A, FIG. 4B, FIG. 4C, FIG. 4D, FIG. 4E, FIG. 4F, FIG. 4G, FIG. 4H, FIG. 4I, and FIG. 4J illustrate a data deduplication scenario that implements data unit deduplication across disparate infrastructure-as-a-service entities, according to an embodiment.
Figure 4B:
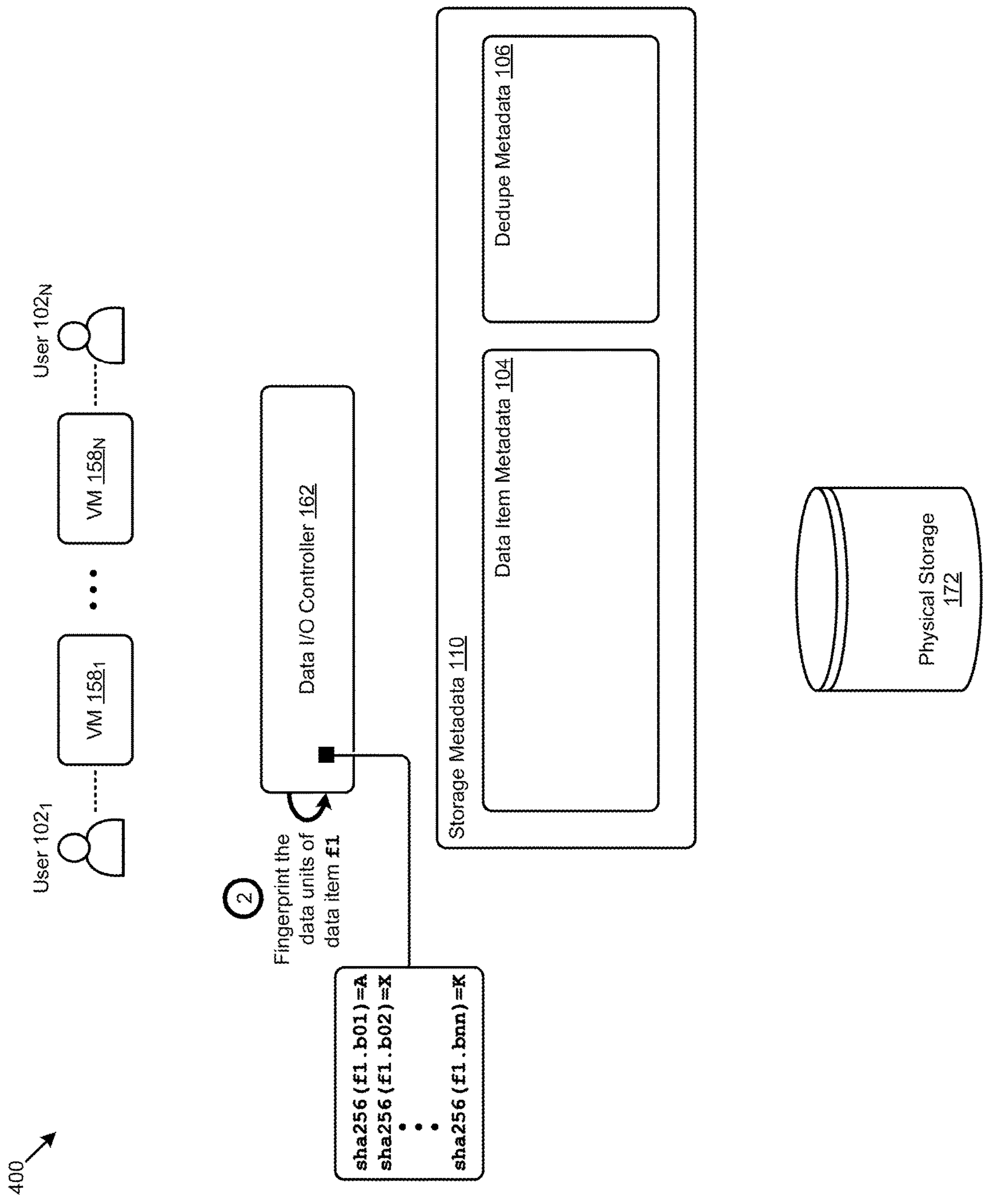
Figure 4C:
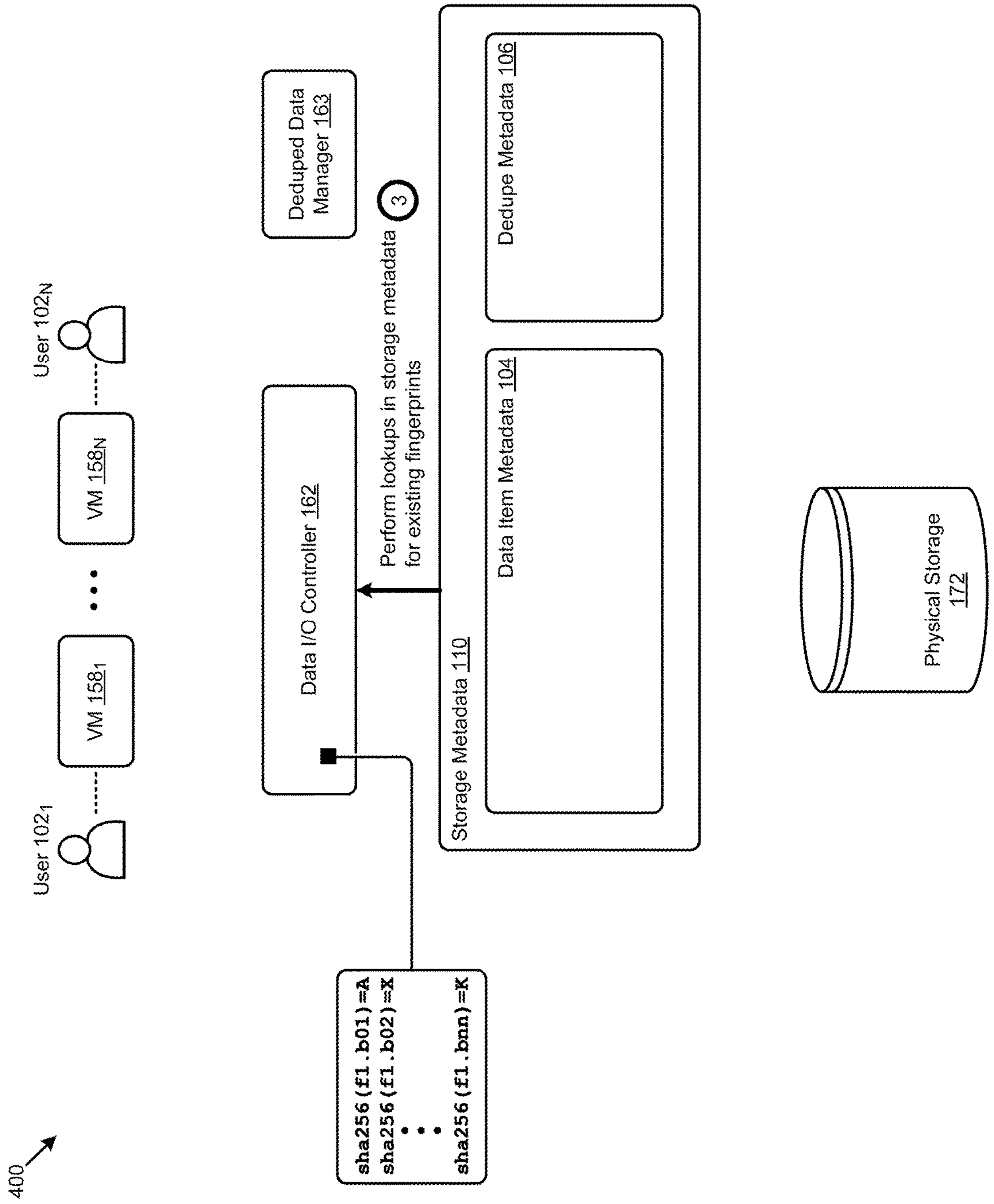
Figure 4D:
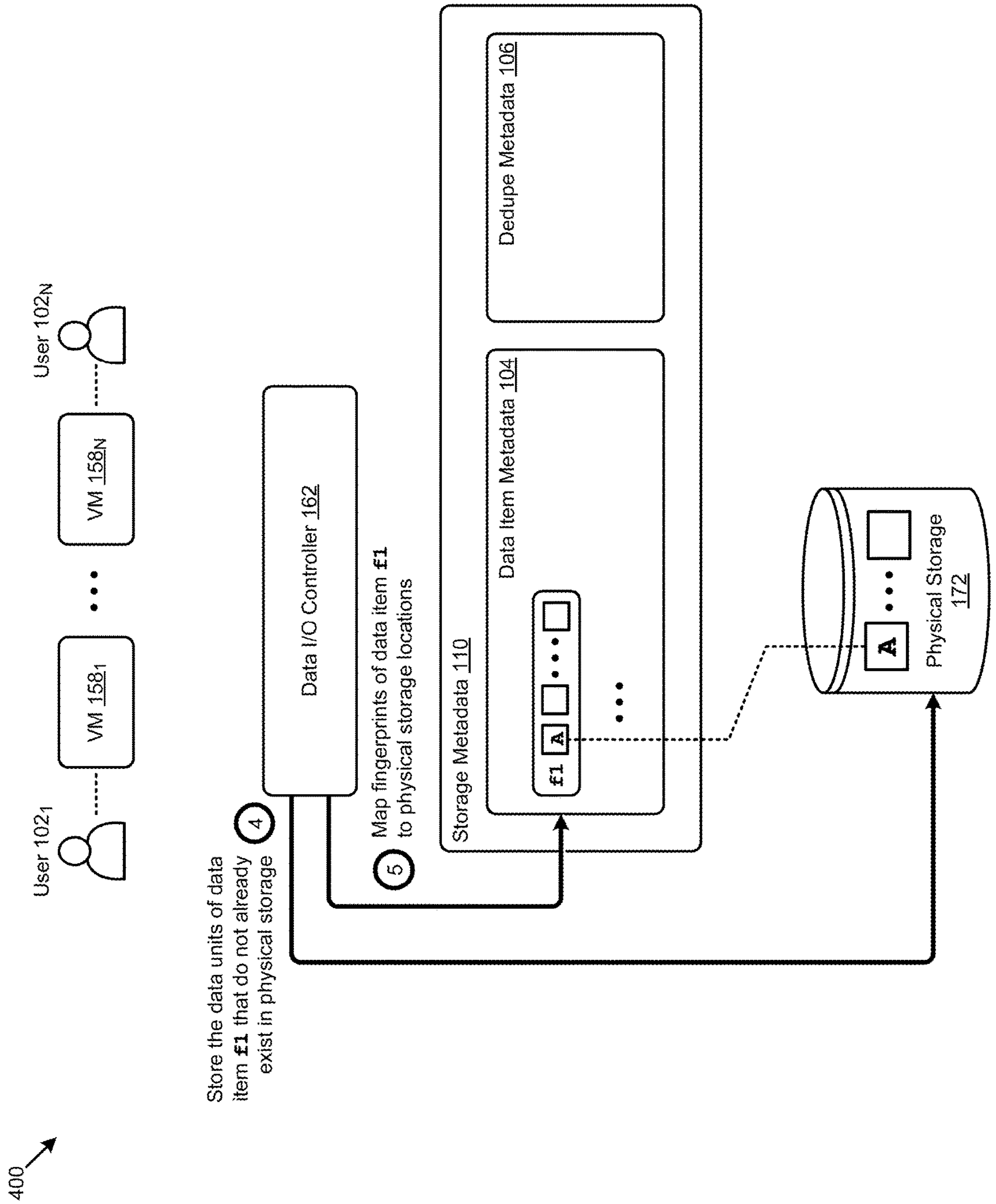
Figure 4E:
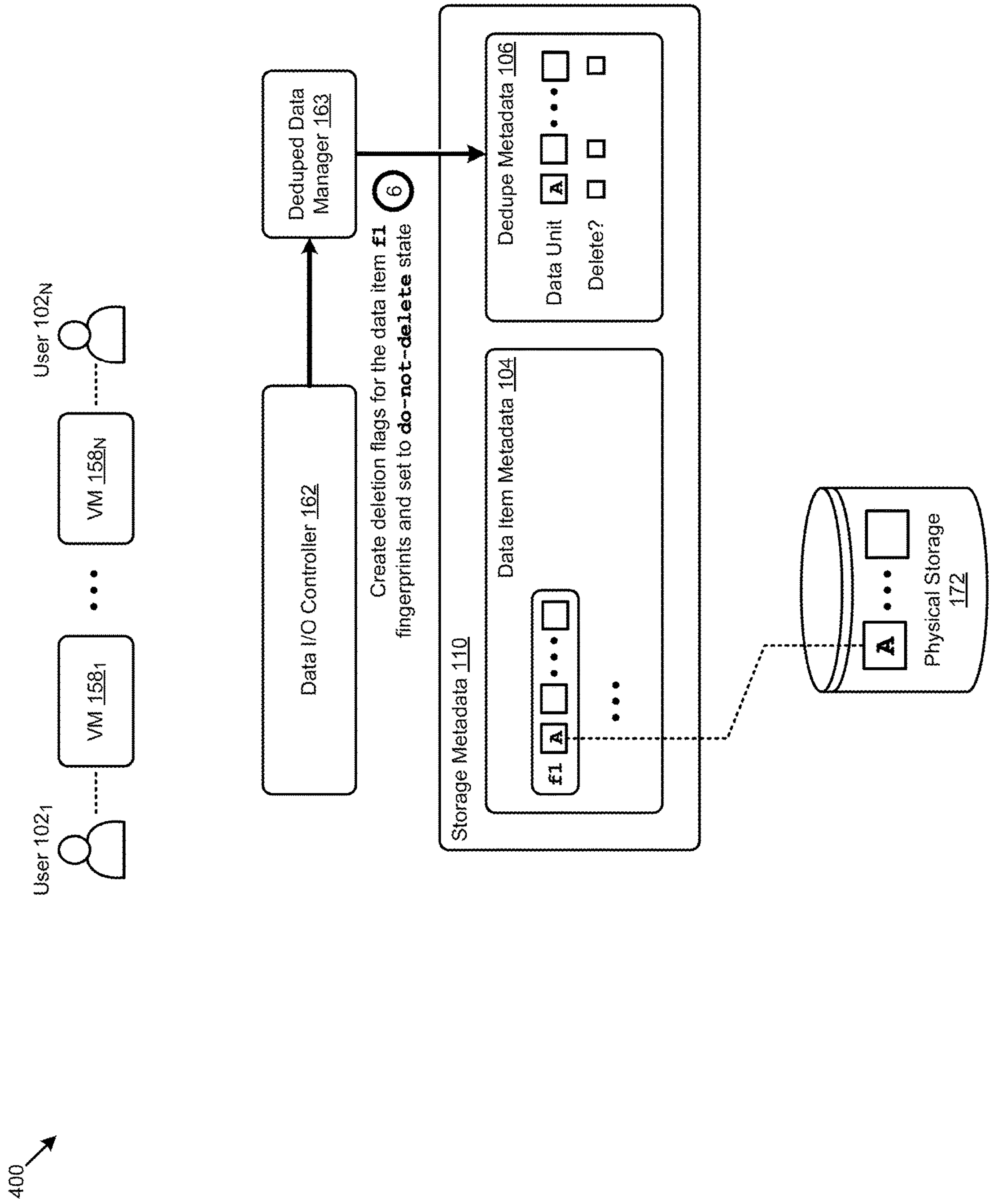

Specifically, referring to FIG. 4A, deduplicated data tracking scenario 400 commences with user 1021 interacting with VM 1581 to issue a data I/O operation to data I/O controller 162 to write the data item "f1". For example, data item "f1" might be a new data item that is being written by the computing resource of VM 1581 (operation 1). As shown in FIG. 4B, data I/O controller 162 fingerprints the data units of data item "f1" (operation 2). For example, and as shown, the data units might be 16K data blocks (e.g., "b01", "b02", . . . , "bnn") that are exposed to a SHA-1 hashing scheme to produce unique fingerprints (e.g., "A", "X", . . . , "K") associated with each data block. Referring to FIG. 4C, storage metadata 110 is scanned or subjected to lookup operations to determine whether any of the generated fingerprints exist (operation 3). As can be observed in FIG. 4D, any data units of data item "f1" that do not already exist are stored in physical storage 172 (operation 4). Map entries that map the fingerprints of data item "f1" to the physical storage locations are also implemented in the data item metadata 104 of storage metadata 110 (operation 5). As shown in FIG. 4E, in accordance with the herein disclosed techniques, Boolean deletion flags associated with the data item "f1" data unit fingerprints are created (e.g., by deduped data manager 163) in dedupe metadata 106 and set to a "do-not-delete" state (operation 6).

Figure 4F:
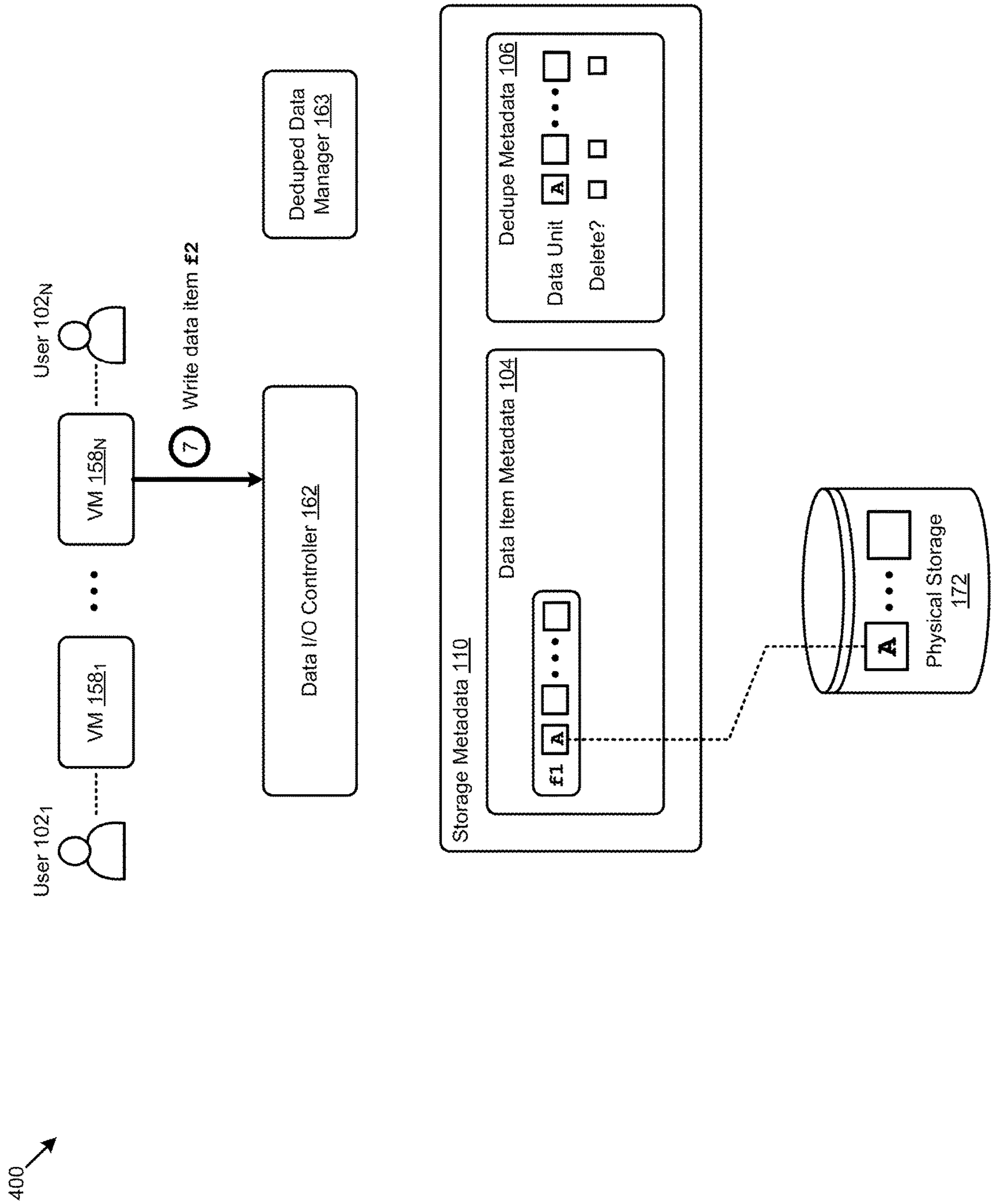
Figure 4G:
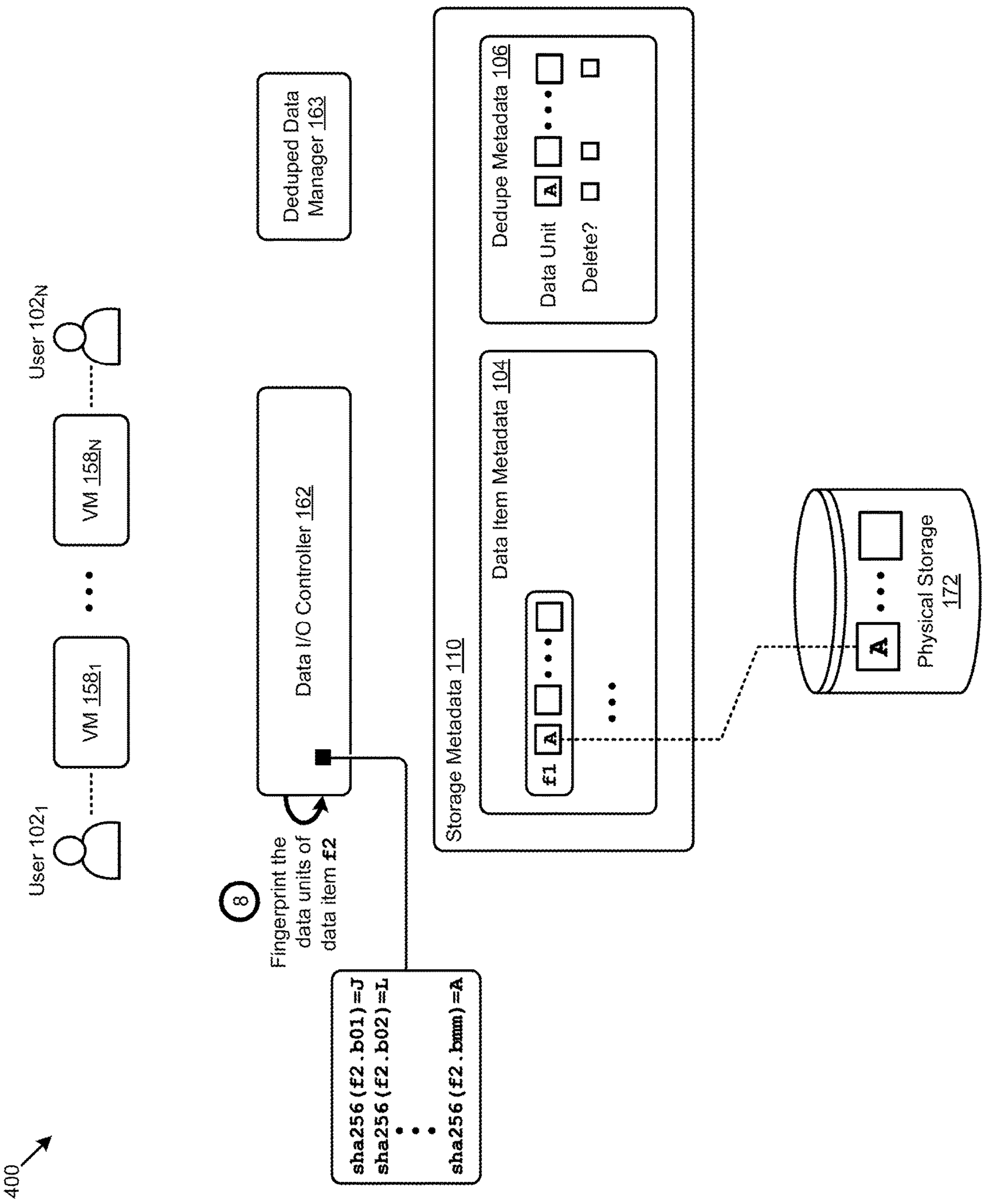
Figure 4H:
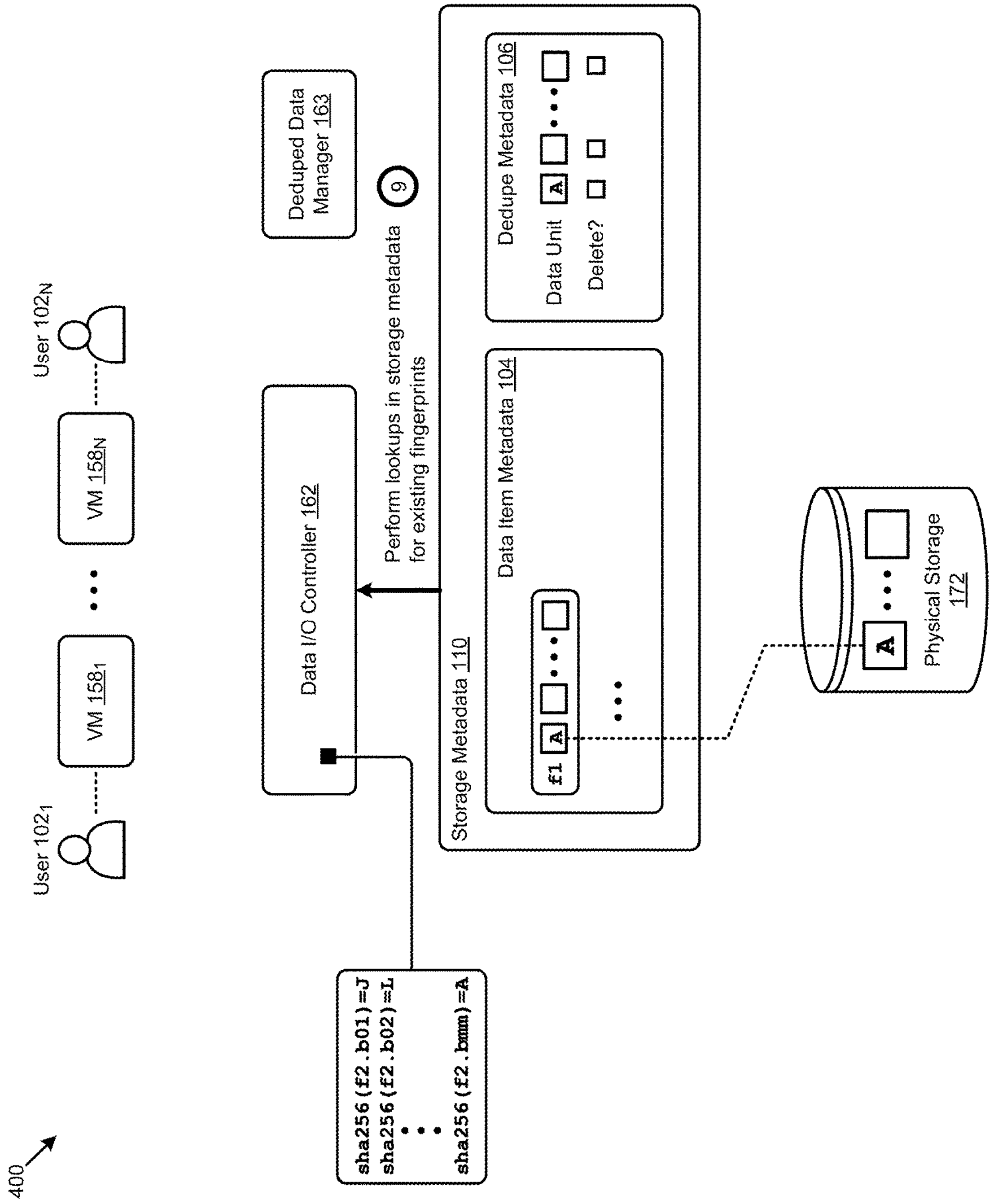
Figure 4I:
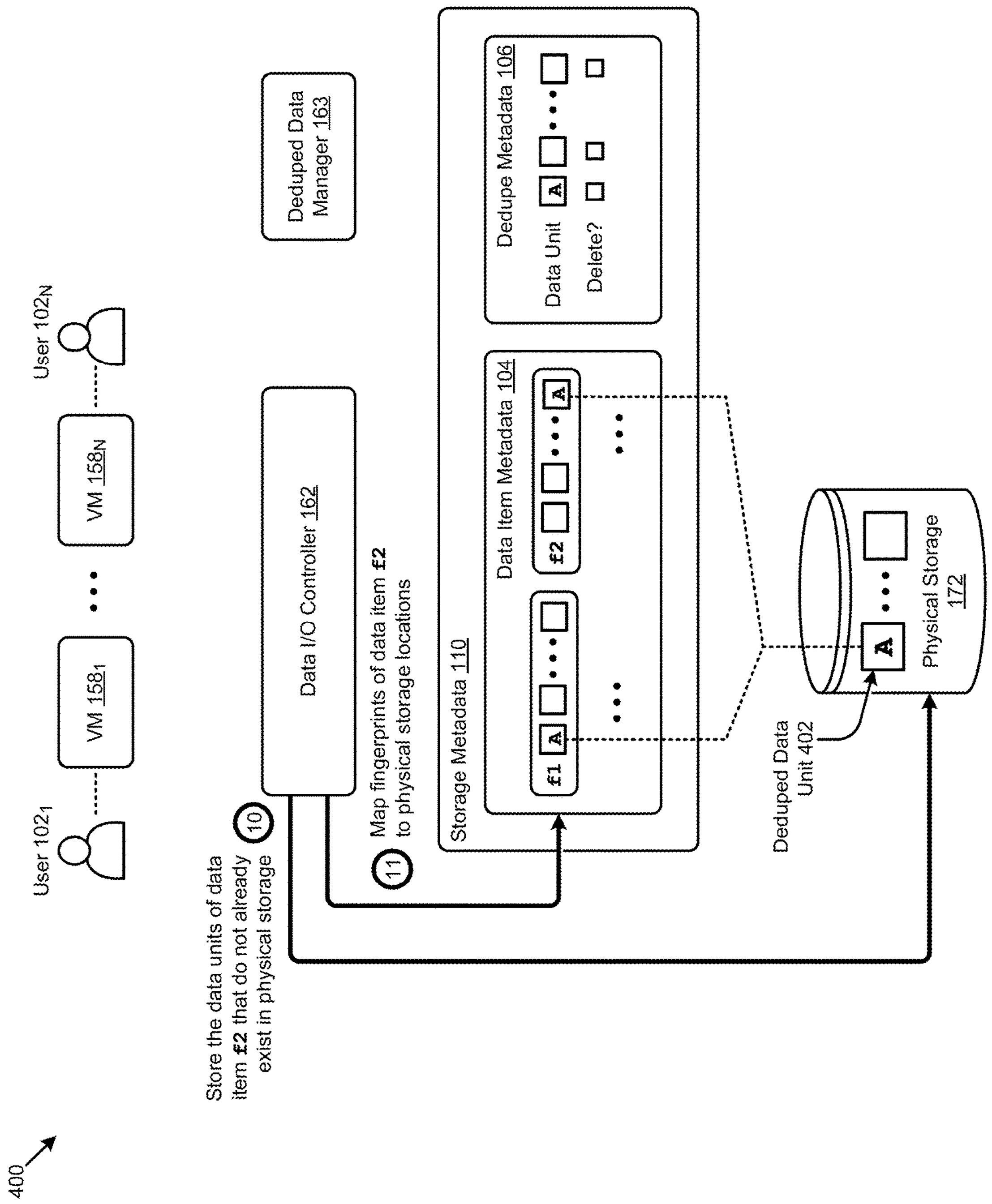

Referring to FIG. 4F, user 102N might interact with VM 158N at a later moment in time to issue a data I/O operation to data I/O controller 162 to write data item "f2" (operation 7). As shown in FIG. 4G, data I/O controller 162 fingerprints the data units of data item "f2" (operation 8). For example, and as shown, the fingerprints of data item "f2" might include fingerprints "J", "L", and "A". Referring to FIG. 4H, storage metadata 110 is scanned or subjected to lookup operations to determine whether any of the generated fingerprints already exist (operation 9).

Figure 4J:
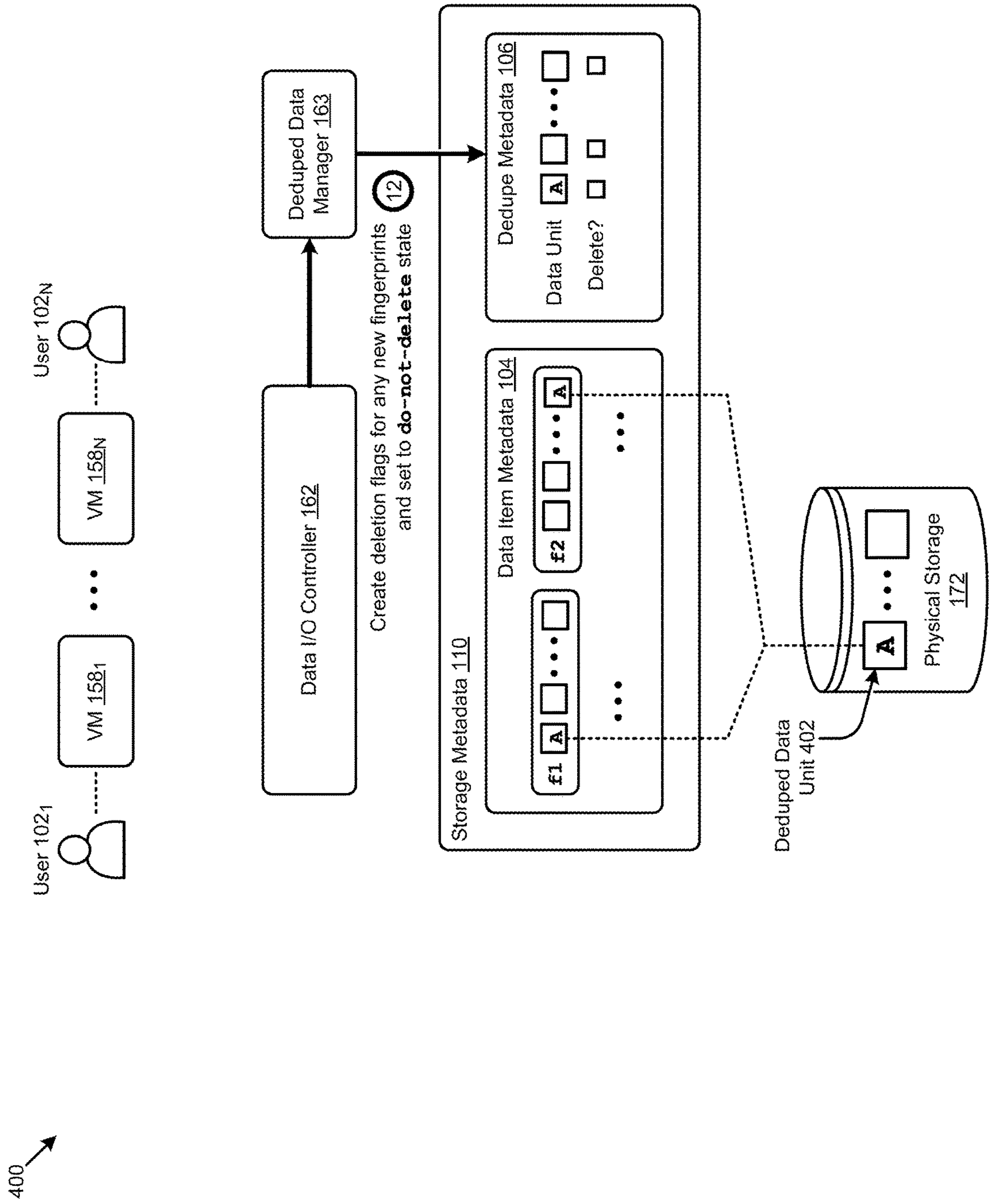

For example, the scan might reveal that fingerprint "A" of data item "f2" already exists as part of data item "f1". As can be observed in FIG. 4I, any data units of data item "f2" that do not already exist are stored in physical storage 172 (operation 10). Map entries that map the fingerprints of data item "f2" to the physical storage locations are also implemented in the data item metadata 104 of storage metadata 110 (operation 11). As an example, data units associated with fingerprints "J" and "L" might be stored in physical storage 172 and the association between the data units "J" and "L" mapped in data item metadata 104, while fingerprint "A" of data item "f2" is mapped to the earlier stored data unit also having the "A" fingerprint. In this case, the data unit having the "A" fingerprint is deduplicated since multiple files and/or computing resources (e.g., VM 1581 . . . , VM 158N) reference one instance of the data unit (e.g., deduped data unit 402). As shown in FIG. 4J, in accordance with the herein disclosed techniques, Boolean deletion flags associated with any fingerprints from data item "f2" not existing in dedupe metadata 106 are created and set to a "do-not-delete" state (operation 12).

The herein disclosed techniques for deduped data tracking as illustrated in deduplicated data tracking scenario 400 can further facilitate other deduplicated data management operations, such as garbage collection. One embodiment of a technique for implementing such deduplicated data management operations is shown and described as pertaining to FIG. 5.

FIG. 5 depicts a deduplicated data management technique 500 as implemented in systems that facilitate efficiently managing deduplicated data in large scale distributed computing environments. As an option, one or more variations of deduplicated data management technique 500 or any aspect thereof may be implemented in the context of the architecture and functionality of the embodiments described herein. The deduplicated data management technique 500 or any aspect thereof may be implemented in any environment.

The deduplicated data management technique 500 presents one embodiment of certain steps and/or operations that facilitate efficient management (e.g., garbage collection) of deduplicated data in large scale distributed computing environments. The deduplicated data management technique 500 can commence by enumerating the data unit fingerprints in a set of dedupe metadata (step 502). For each data unit fingerprint, the data item metadata is scanned to identify any map entries that reference the fingerprint (step 504). In some cases, for example, the scan can halt when at least one map entry is detected. In other cases, the entire set of data item metadata might be scanned to determine a total count of map entries for a given fingerprint. In these cases, if any map entries exist (see "Yes" path of decision 506), a count of the map entries can be recorded as analysis data for statistical analysis of the deduplication operations (step 514). When no map entries exist for a given data unit fingerprint (see "No" path of decision 506), and the data unit Boolean deletion flag is set to the "do-not-delete" state (see "No" path of decision 508), then the data unit Boolean deletion flag is set to the "delete" state (step 512). When no map entries exist for a give data unit fingerprint (see "No" path of decision 506), and the data unit Boolean deletion flag is set to the "delete" state (see "Yes" path of decision 508), then deduped data management operations to delete the data unit and any associated metadata (e.g., dedupe metadata) are invoked (step 510).

Further details regarding general approaches to handling data deduplication are described in U.S. Pat. No. 10,635,639 titled "MANAGING DEDUPLICATED DATA" issued on Apr. 28, 2020, which is hereby incorporated by reference in its entirety.

ADDITIONAL EMBODIMENTS OF THE DISCLOSURE

Instruction Code Examples

Figure 6:
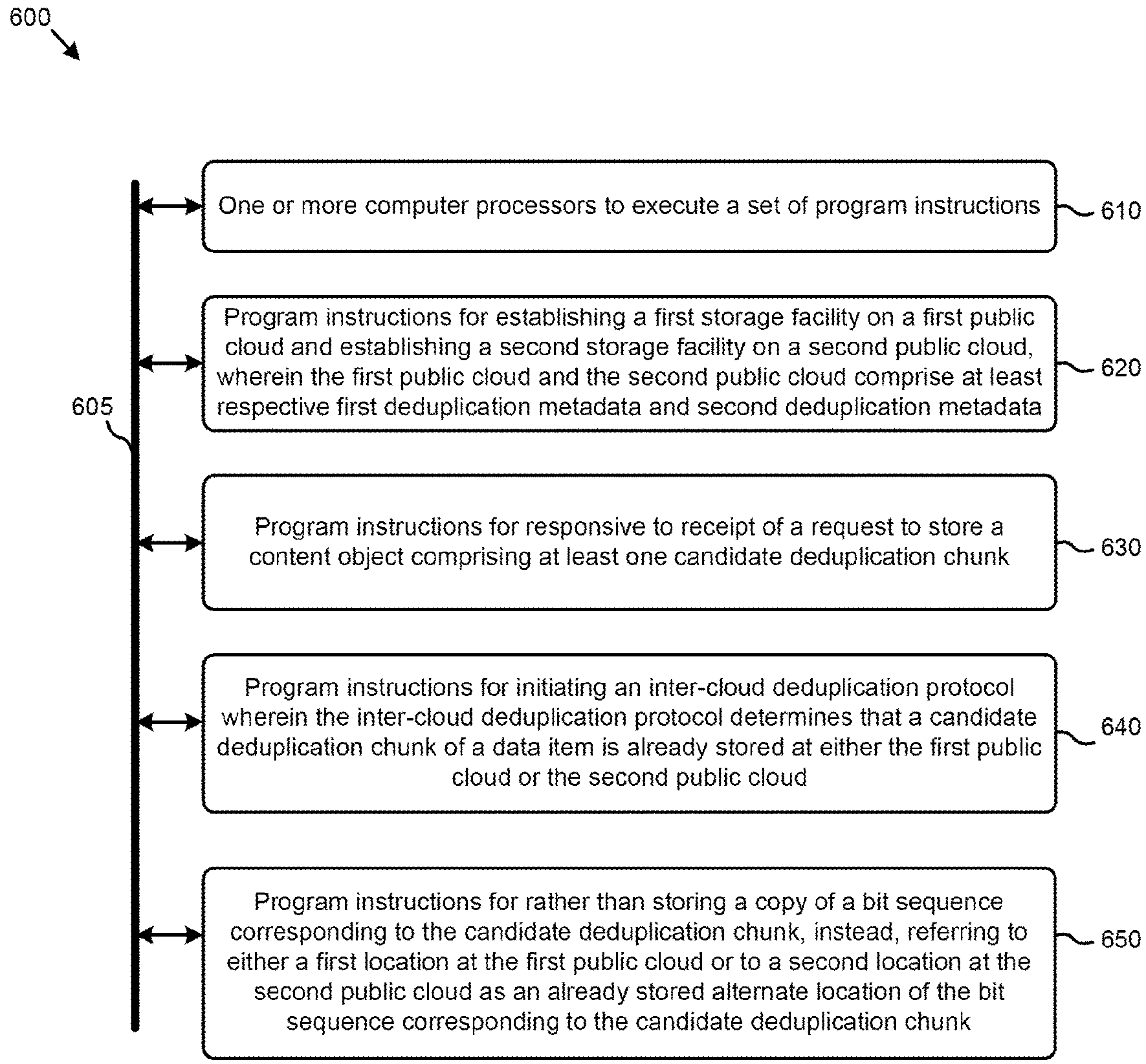
FIG. 6 depicts system components as arrangements of computing modules that are interconnected so as to implement certain of the herein-disclosed embodiments.

FIG. 6 depicts system 600 as an arrangement of computing modules that are interconnected so as to operate cooperatively to implement certain of the herein-disclosed embodiments. This and other embodiments present particular arrangements of elements that, individually or as combined, serve to form improved technological processes that address need for reconciliation of storage features between different infrastructure-as-a-service vendors. The partitioning of system 600 is merely illustrative and other partitions are possible. As an option, system 600 may be implemented in the context of the architecture and functionality of the embodiments described herein. Of course, however, system 600 or any operation therein may be carried out in any desired environment. System 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: establishing a first storage facility on a first public cloud and establishing a second storage facility on a second public cloud, wherein the first public cloud and the second public cloud comprise at least respective first deduplication metadata and second deduplication metadata (module 620); responsive to receipt of a request to store a content object comprising at least one candidate deduplication chunk (module 630); initiating an inter-cloud deduplication protocol wherein the inter-cloud deduplication protocol determines that a candidate deduplication chunk of a data item is already stored at either the first public cloud or the second public cloud (module 640); and rather than storing a copy of a bit sequence corresponding to the candidate deduplication chunk, instead, referring to either a first location at the first public cloud or to a second location at the second public cloud as an already stored alternate location of the bit sequence corresponding to the candidate deduplication chunk (module 650).

Variations of the foregoing may include more or fewer of the shown modules. Certain variations may perform more or fewer (or different) steps and/or certain variations may use data elements in more, or in fewer steps, and/or in the context of alternative operations. Still further, some embodiments include variations in the alternative operations performed, and some embodiments include variations of aspects of the data elements used in the operations. Strictly as one example, one or more of the foregoing variations may perform steps or operations that include: (1) enumerating a set of map entries corresponding to a data unit; and (2) setting a usage state to an in-use state when the set of map entries is a non-empty set, or setting to a not-in-use state when the set of map entries is an empty set.

System Architecture Overview

Additional System Architecture Examples

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 7A, FIG. 7B, FIG. 7C, and FIG. 7D.

Figure 7A:
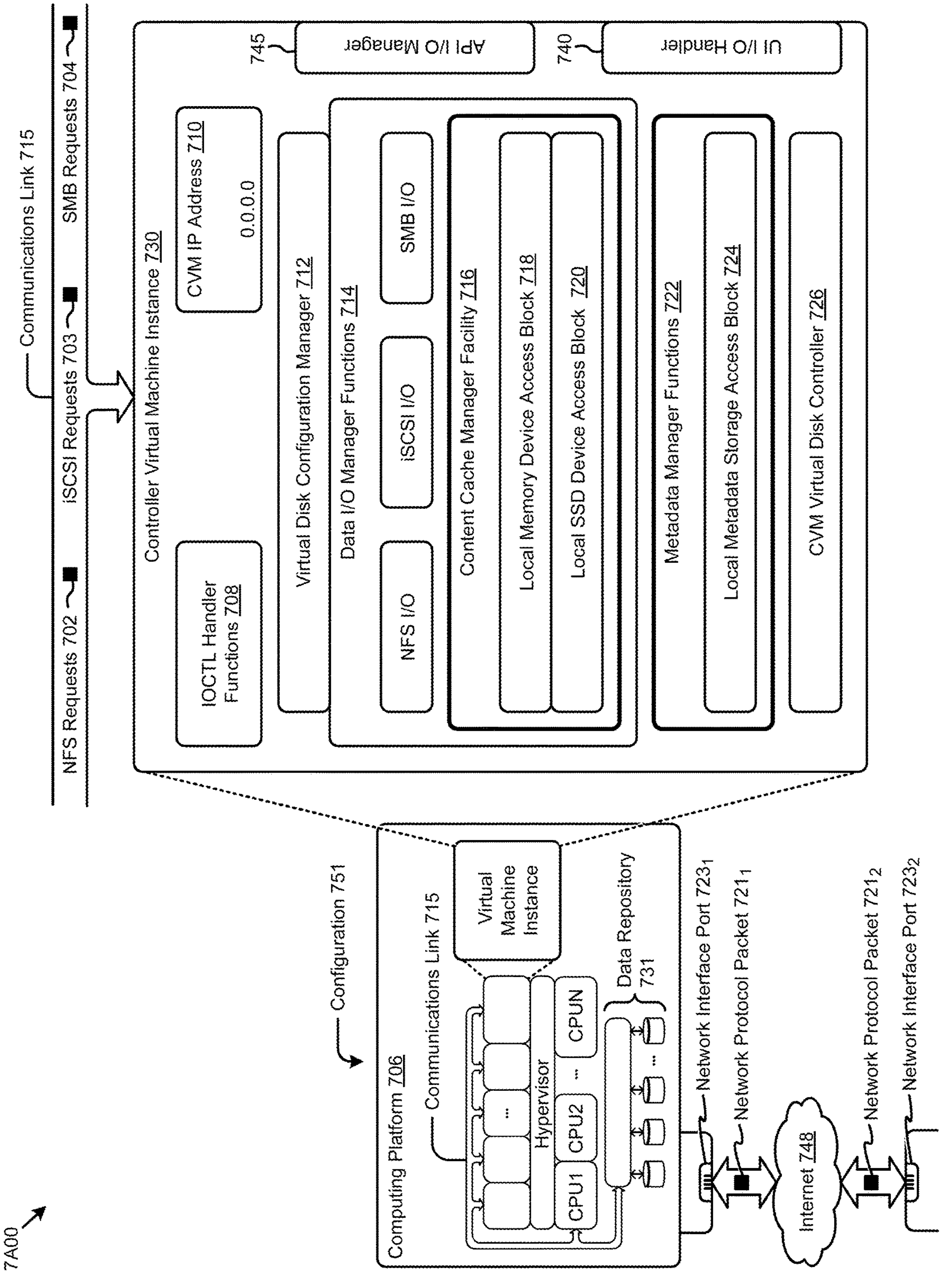
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., hub-and-spoke topologies, rings, meshes, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines are configured for processing of storage inputs or outputs (I/O or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer system interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control (IOCTL) handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports input or output (IO) of any form (e.g., block IO, streaming IO) and/or packet-based IO such as hypertext transport protocol (HTTP) traffic, etc., through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . , CPUN). According to certain embodiments of the disclosure, two or more instances of configuration 751 can be coupled by communications link 715 (e.g., backplane, local area network, public switched telephone network, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 7231 and network interface port 7232). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 7211 and network protocol packet 7212).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to content management services for infrastructure-as-a-service entities. In some embodiments, a module may include one or more state machines and/or combinational logic used to implement or facilitate the operational and/or performance characteristics pertaining to content management services for infrastructure-as-a-service entities.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of content management services for infrastructure-as-a-service entities). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to content management services for infrastructure-as-a-service entities, and/or for improving the way data is manipulated when performing computerized operations pertaining to deployment of a feature-rich data warehouse that federates different infrastructure-as-a-service vendors.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 7B:
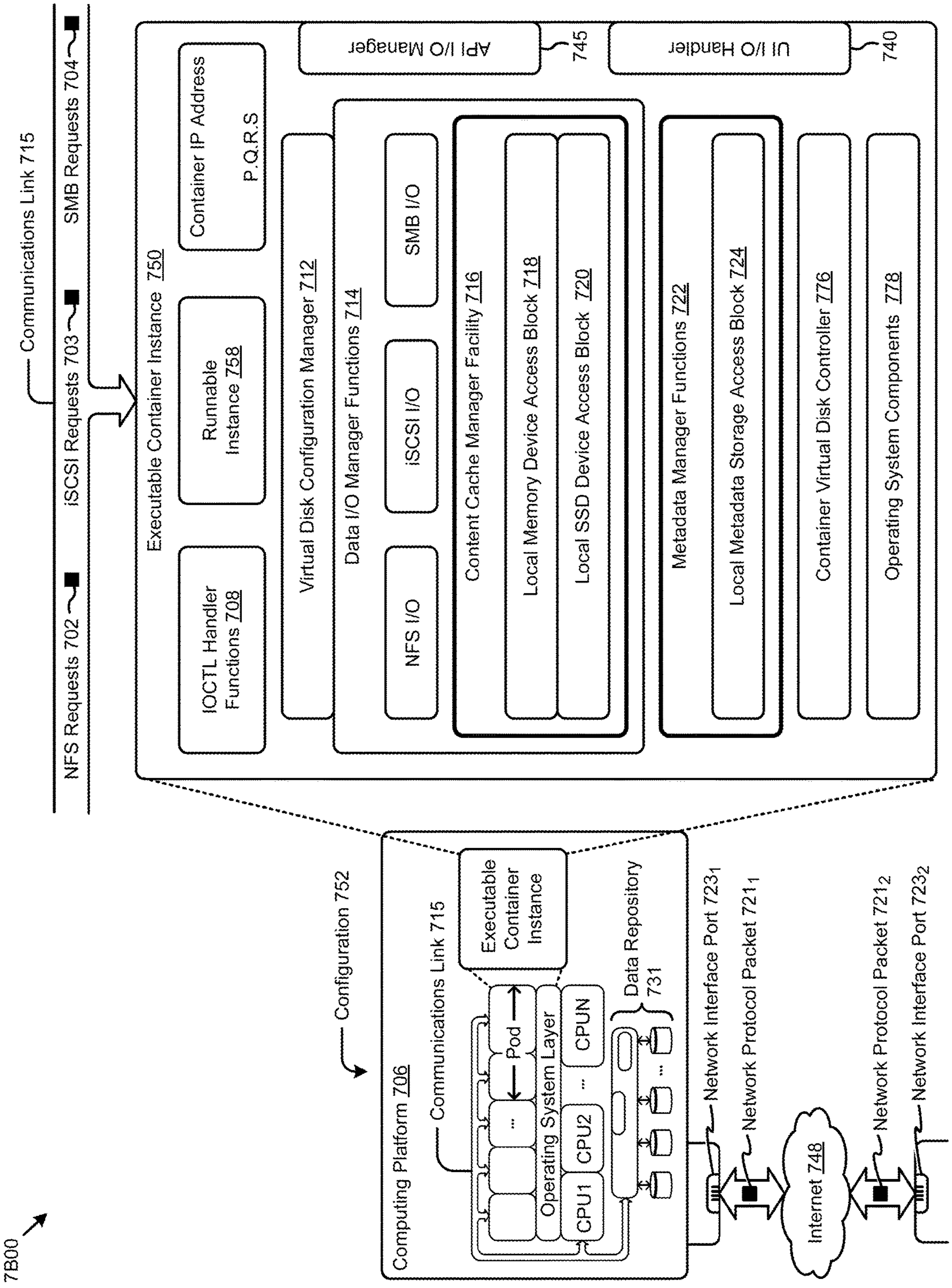

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a corresponding virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
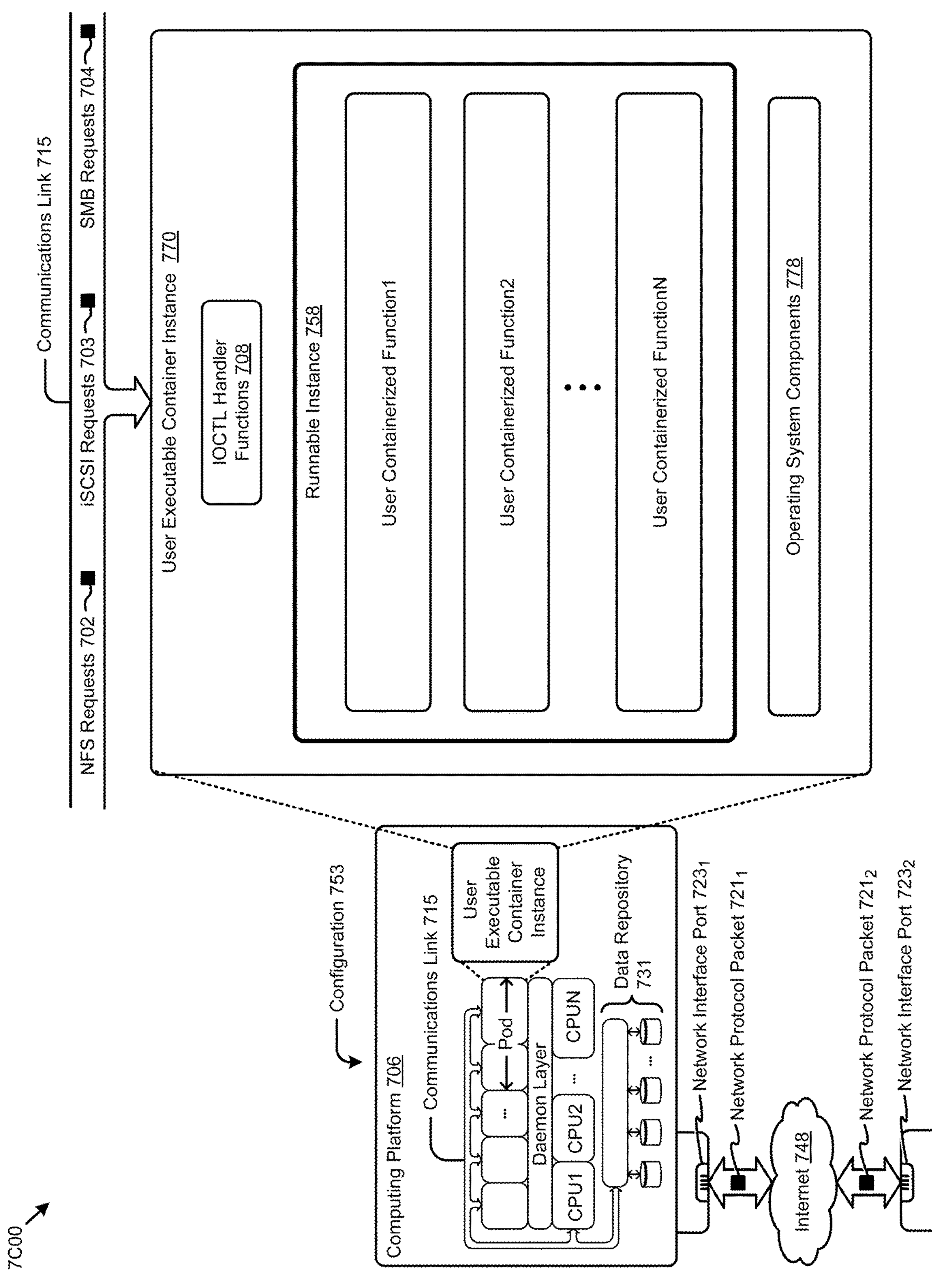

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
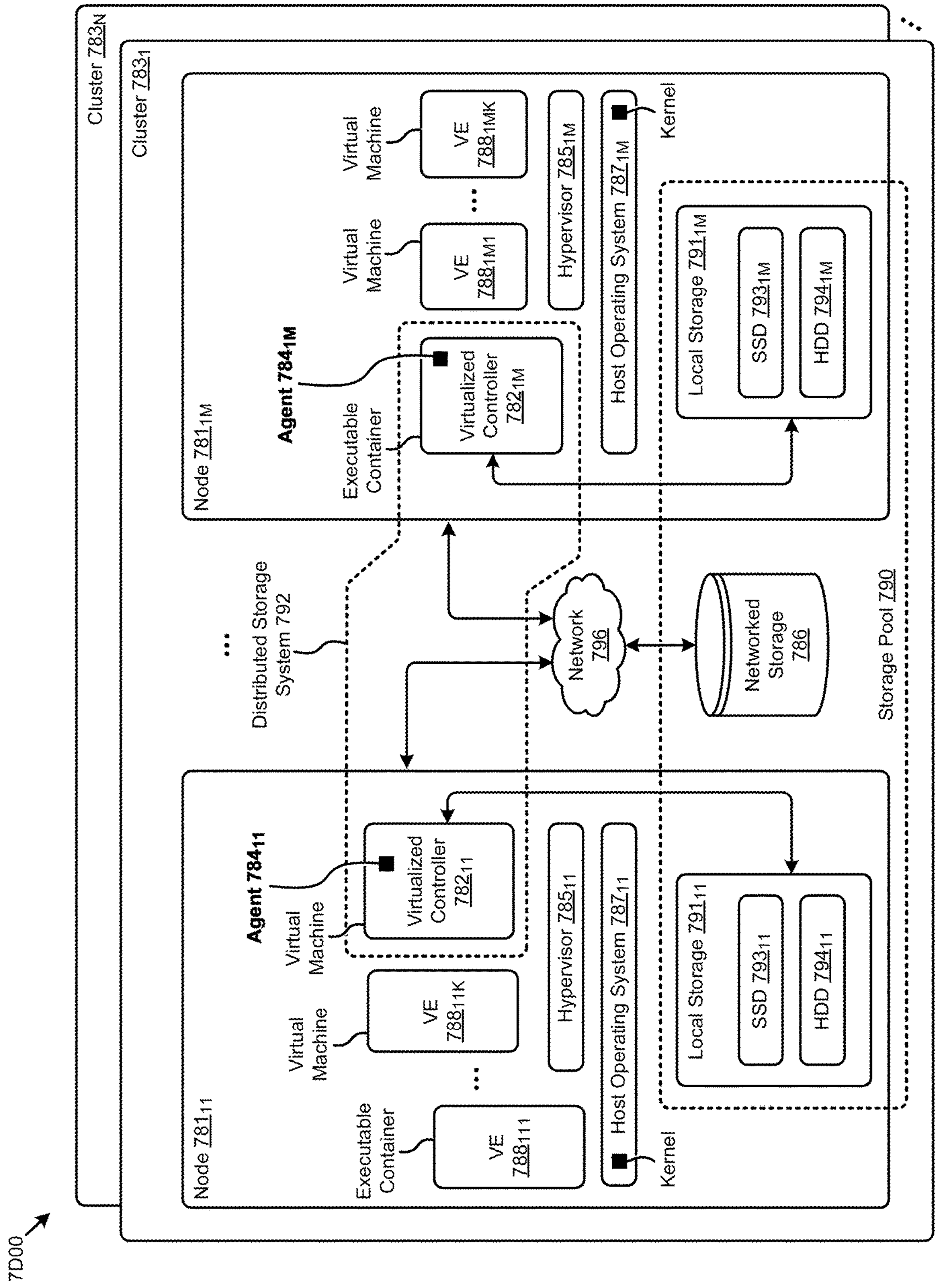

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster $783_1$, . . . , cluster $783_N$) comprising multiple nodes that have multiple tiers of storage in a storage pool. Representative nodes (e.g., node $781_{11}$, . . . , node $781_{1M}$) and storage pool 790 associated with cluster $783_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, . . . , local storage $791_{1M}$). For example, the local storage can be within or directly attached to a server and/or appliance associated with the nodes. Such local storage can include solid state drives (SSD $793_{11}$, . . . , SSD $793_{1M}$), hard disk drives (HDD $794_{11}$, . . . , HDD $794_{1M}$), and/or other storage devices.

As shown, any of the nodes of the distributed virtualization system can implement one or more user virtualized entities (VEs) such as the virtualized entity (VE) instances shown as VE $788_{111}$, . . . , VE $788_{11K}$, . . . , VE $788_{1M1}$, . . . , VE $788_{1MK}$, and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}$, . . . , hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $787_{11}$, . . . , host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node $781_{1M}$ can access the storage pool 790 by interfacing with a controller container (e.g., virtualized controller $782_{1M}$) through hypervisor $785_{1M}$ and/or the kernel of host operating system $787_{1M}$.

In certain embodiments, one or more instances of an agent can be implemented in the distributed storage system 792 to facilitate the herein disclosed techniques. Specifically, agent $784_{11}$ can be implemented in the virtualized controller $782_{11}$, and agent $784_{1M}$ can be implemented in the virtualized controller $782_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to deployment of a feature-rich data warehouse that federates different infrastructure-as-a-service vendors can be brought to bear through implementation of any one or more of the foregoing techniques. Moreover, any aspect or aspects of need for reconciliation of storage features between different infrastructure-as-a-service vendors can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:

receiving a request to store a content object on a first storage facility on a first cloud of a data warehouse spanning the first storage facility on the first cloud and a second storage facility on a second cloud, wherein the first cloud comprises at least a first controller, the first storage facility, and first deduplication metadata, the request to store the content object is received by the first controller, the content object comprises at least one candidate deduplication chunk. and the second cloud comprises at least a second controller, the second storage facility, and second deduplication metadata;

responsive to receipt of the request to store the content object comprising the at least one candidate deduplication chunk:

transmitting, by the first controller on the first cloud, a first message to the second controller on the second cloud as part of an inter-cloud deduplication protocol, wherein the inter-cloud deduplication protocol exchanges one or more messages between the first controller on the first cloud and the second controller on the second cloud to determine whether a candidate deduplication chunk of a data item is already stored in the second storage facility on the second cloud;

receiving, at the first controller on the first cloud, a second message from the second controller on the second cloud as part of the inter-cloud deduplication protocol, wherein the second message indicates that the candidate deduplication chunk of the data item is already stored in the second storage facility on the second cloud; and storing, by the first controller on the first cloud, a reference to a second location at the second public cloud as an already stored location of a bit sequence corresponding to the candidate deduplication chunk in response to the second message from the second controller on the second cloud.

2. The non-transitory computer readable medium of claim 1, wherein the acts further comprise:

responsive to receipt of a request at the first controller to store a second content object comprising at least one second candidate deduplication chunk:

transmitting, by the first controller on the first cloud, a third message to the second controller on the second cloud as part of the inter-cloud deduplication protocol to determine whether a second candidate deduplication chunk of a second data item is already stored in the second storage facility on the second public cloud; and wherein a fourth message is sent to a third controller to determine whether the second candidate deduplication chunk of the second data item is already stored in a third storage facility on the third cloud, the data warehouse further spans the third storage facility on the third cloud, the third cloud comprises at least a third controller, the third storage facility, and third deduplication metadata.

3. The non-transitory computer readable medium of claim 2, wherein the fourth message is sent to the third controller on the third cloud by the second controller on the second cloud.

4. The non-transitory computer readable medium of claim 2, wherein the fourth message is sent to the third controller on the third cloud using a protocol different from the inter-cloud deduplication protocol.

5. The non-transitory computer readable medium of claim 1, further comprising instructions which, when stored in memory and executed by the processor cause the processor to perform further acts of generating a map entry in data item metadata to map a data unit to a physical storage location, wherein the data unit is a deduplicated data unit in deduplication metadata, the data item metadata and the deduplication metadata are different data structures, and the data item metadata and the deduplication metadata are distributed over a plurality of computing nodes.

6. The non-transitory computer readable medium of claim 5, further comprising instructions which, when stored in memory and executed by the processor cause the processor to perform further acts of performing a scan of the data item metadata for the data unit, wherein an in-use state is set in the deduplication metadata for the data unit when the map entry is detected for the data unit in the data item metadata, a not-in-use state and a deletion state are set for the data unit in the deduplication metadata when the map entry is not detected in the data item metadata for the data unit, and the data unit is deleted from the physical storage location based at least in part on a result of the scan when the data unit is determined to correspond to the not-in-use state and the deletion state.

7. The non-transitory computer readable medium of claim 1, wherein deduplication of the candidate deduplication chunk of a data item is managed without implementing a reference count value of the candidate deduplication chunk and the first storage facility on the first cloud and the second storage facility on the second cloud are blob storage facilities.

8. The non-transitory computer readable medium of claim 1, wherein the data warehouse was created using a graphical user interface having at least a first field for identifying the first cloud, a second field for identifying the second cloud, and a third field for identifying a plug-in for implementing the inter-cloud deduplication protocol.

9. A method comprising:

receiving a request to store a content object on a first storage facility on a first cloud of a data warehouse spanning the first storage facility on the first cloud and a second storage facility on a second cloud, wherein the first cloud comprises at least a first controller, the first storage facility, and first deduplication metadata, the request to store the content object is received by the first controller, the content object comprises at least one candidate deduplication chunk, and the second cloud comprises at least a second controller, the second storage facility, and second deduplication metadata;

responsive to receipt of the request to store the content object comprising the at least one candidate deduplication chunk:

transmitting, by the first controller on the first cloud, a first message to the second controller on the second cloud as part of an inter-cloud deduplication protocol, wherein the inter-cloud deduplication protocol exchanges one or more messages between the first controller on the first cloud and the second controller on the second cloud to determine whether a candidate deduplication chunk of a data item is already stored in the second storage facility on the second cloud;

receiving, at the first controller on the first cloud, a second message from the second controller on the second cloud as part of the inter-cloud deduplication protocol, wherein the second message indicates that the candidate deduplication chunk of the data item is already stored in the second storage facility on the second cloud; and storing, by the first controller on the first cloud, a reference to a second location at the second cloud as an already stored location of a bit sequence corresponding to the candidate deduplication chunk in response to the second message from the second controller on the second cloud.

10. The method of claim 9, further comprising:

responsive to receipt of a request at the first controller to store a second content object comprising at least one second candidate deduplication chunk:

transmitting, by the first controller on the first cloud, a third message to the second controller on the second cloud as part of the inter-cloud deduplication protocol to determine whether a second candidate deduplication chunk of a second data item is already stored in the second storage facility on the second cloud; and wherein a fourth message is sent to a third controller on a third cloud to determine whether the second candidate deduplication chunk of the second data item is already stored in a third storage facility on the third cloud, the data warehouse further spans the third storage facility on the third cloud, the third cloud comprises at least a third controller, the third storage facility, and third deduplication metadata.

11. The method of claim 10, wherein the fourth message is sent to the third controller on the third cloud by the second controller on the second cloud.

12. The method of claim 10, wherein the fourth message is sent to the third controller on the third cloud using a protocol different from the inter-cloud deduplication protocol.

13. The method of claim 9, further comprising generating a map entry in data item metadata to map a data unit to a physical storage location, wherein the data unit is a deduplicated data unit in deduplication metadata, and wherein the data item metadata and the deduplication metadata are different data structures, and the data item metadata and the deduplication metadata are distributed over a plurality of computing nodes.

14. The method of claim 13, further comprising performing a scan of the data item metadata for the data unit, wherein an in-use state is set in the deduplication metadata for the data unit when the map entry is detected for the data unit in the data item metadata, a not-in-use state and a deletion state are set for the data unit in the deduplication metadata when the map entry is not detected in the data item metadata for the data unit, and the data unit is deleted from the physical storage location based at least in part on a result of the scan when the data unit is determined to correspond to the not-in-use state and the deletion state.

15. The method of claim 9, wherein deduplication of the candidate deduplication chunk of a data item is managed without implementing a reference count value of the candidate deduplication chunk and the first storage facility on the first cloud and the second storage facility on the second cloud are blob storage facilities.

16. The method of claim 9, wherein the data warehouse was created using a graphical user interface having at least a first field for identifying the first cloud, a second field for identifying the second cloud, and a third field for identifying a plug-in for implementing the inter-cloud deduplication protocol.

17. A system comprising:

a storage medium having stored thereon a sequence of instructions; and a processor that executes the sequence of instructions to cause the processor to perform acts comprising, receiving a request to store a content object on a first storage facility on a first cloud of a data warehouse spanning the first storage facility on the first cloud and a second storage facility on a second cloud, wherein the first cloud comprises at least a first controller, the first storage facility, and first deduplication metadata, the request to store the content object is received by the first controller, the content object comprises at least one candidate deduplication chunk, and the second cloud comprises at least a second controller, the second storage facility, and second deduplication metadata;

responsive to receipt of the request to store the content object comprising the at least one candidate deduplication chunk:

transmitting, by the first controller on the first cloud, a first message to the second controller on the second cloud as part of initiating an inter-cloud deduplication protocol, wherein the inter-cloud deduplication protocol exchanges one or more messages between the first controller on the first public cloud and the second controller the second storage facility on the second publie-cloud to determine whether a candidate deduplication chunk of a data item is already stored in the second storage facility on the second cloud;

receiving, at the first controller on the first cloud, a second message from the second controller on the second cloud as part of the inter-cloud deduplication protocol, wherein the second message indicates that the candidate deduplication chunk of the data item is already stored in the second storage facility on the second cloud; and storing, by the first controller on the first cloud, a reference to a second location at the second publie-cloud as an already stored location of a bit sequence corresponding to the candidate deduplication chunk in response to the second message from the second controller on the second cloud.

18. The system of claim 17, wherein the acts further comprise:

responsive to receipt of a request at the first controller to store a second content object comprising at least one second candidate deduplication chunk:

transmitting, by the first controller on the first cloud, a third message to the second controller on the second cloud as part of the inter-cloud deduplication protocol to determine whether a second candidate deduplication chunk of a second data item is already stored in the second storage facility on the second cloud; and wherein a fourth message is sent to a third controller on a third cloud to determine whether the second candidate deduplication chunk of the second data item is already stored in a third storage facility on the third cloud, the data warehouse further spans the third storage facility on the third cloud, the third cloud comprises at least a third controller, the third storage facility, and third deduplication metadata.

19. The system of claim 18, wherein the fourth message is sent to the third controller on the third cloud by the second controller on the second cloud.

20. The system of claim 18, wherein the fourth message is sent to the third controller on the third cloud using a protocol different from the inter-cloud deduplication protocol.

21. The system of claim 17, further comprising instructions which, when stored in memory and executed by the processor cause the processor to perform further acts of generating a map entry in data item metadata to map a data unit to a physical storage location, wherein the data unit is a deduplicated data unit in deduplication metadata, and wherein the data item metadata and the deduplication metadata are different data structures, and the data item metadata and the deduplication metadata are distributed over a plurality of computing nodes.

22. The system of claim 21, further comprising instructions which, when stored in memory and executed by the processor cause the processor to perform further acts of performing a scan of the data item metadata for the data unit, wherein an in-use state is set in the deduplication metadata for the data unit when the map entry is detected for the data unit in the data item metadata, a not-in-use state and a deletion state are set for the data unit in the deduplication metadata when the map entry is not detected in the data item metadata for the data unit, and the data unit is deleted from the physical storage location based at least in part on a result of the scan when the data unit is determined to correspond to the not-in-use state and the deletion state.

23. The system of claim 17, wherein deduplication of the candidate deduplication chunk of a data item is managed without implementing a reference count value of the candidate deduplication chunk and the first storage facility on the first cloud and the second storage facility on the second cloud are blob storage facilities.

24. The system of claim 17, wherein the data warehouse was created using a graphical user interface having at least a first field for identifying the first cloud, a second field for identifying the second cloud, and a third field for identifying a plug-in for implementing the inter-cloud deduplication protocol.

* * * * *